(12) United States Patent
Morgeneier et al.

(10) Patent No.: US 7,613,334 B2
(45) Date of Patent: Nov. 3, 2009

(54) METHOD AND ARRANGEMENT FOR ELECTRONIC RECORDING OF ROLLED FINGERPRINTS

(75) Inventors: Dirk Morgeneier, Jena (DE); Andy Friedl, Eisenberg (DE); Torsten Eichhorn, Jena (DE); Joerg Standau, Jena (DE); Torsten Gerling, Drackendorf (DE)

(73) Assignee: Cross Match Technologies GmbH, Jena (DE)

( * ) Notice: Subject to any disclaimer, the term of this patent is extended or adjusted under 35 U.S.C. 154(b) by 770 days.

(21) Appl. No.: 11/008,819

(22) Filed: Dec. 7, 2004

(65) Prior Publication Data
US 2005/0129292 A1 Jun. 16, 2005

(30) Foreign Application Priority Data
Dec. 11, 2003 (DE) ................ 103 58 738

(51) Int. Cl.
*G06K 9/00* (2006.01)
(52) U.S. Cl. ................ 382/124; 382/115; 382/120; 382/126; 382/127
(58) Field of Classification Search ............... 382/103, 382/115, 120, 123–127; 340/5.52, 5.53, 340/5.81, 5.82; 356/71; 396/15
See application file for complete search history.

(56) References Cited

U.S. PATENT DOCUMENTS

| | | | | |
|---|---|---|---|---|
| 4,784,484 A | * | 11/1988 | Jensen ................ | 356/71 |
| 4,933,976 A | | 6/1990 | Fishbine et al. | |
| 5,230,025 A | * | 7/1993 | Fishbine et al. ........ | 382/127 |

(Continued)

FOREIGN PATENT DOCUMENTS

DE 198 51 544 5/2000

(Continued)

OTHER PUBLICATIONS

Ratha, et al. "Image Mosiacing for Rolled Fingerprint Construction" pp. 1651-1653, 1998.

*Primary Examiner*—Bhavesh M Mehta
*Assistant Examiner*—Gandhi Thirugnanam
(74) *Attorney, Agent, or Firm*—Reed Smith LLP

(57) ABSTRACT

The invention is directed to a method and an arrangement for the optoelectronic recording of a moving object, particularly for recording a finger that is rolled on a support surface. It is the object of the invention to find a novel possibility for electronic recording of rolled fingerprints which enables high-resolution individual images with a high image rate for joining the individual images without gaps to form a total image by means of simple sensors. This object is met, according to the invention, in that a shape surrounding the object is determined from the position and size of the object in at least one of the individual images read out from the image recording unit, in that a rectangle which is enlarged by tolerance allowances and which is oriented parallel to the row direction and column direction of the sensor is determined from the surrounding shape, and in that the enlarged rectangle is used to predict and adjust the size and position of an active pixel area of the image recording unit for at least one image to be read out subsequently, so that the read out active pixel area of the image recording unit is always kept small due to its adaptation and a higher image rate is realized in the sensor readout or data transfer.

22 Claims, 13 Drawing Sheets

U.S. PATENT DOCUMENTS

| | | | |
|---|---|---|---|
| 5,812,252 A * | 9/1998 | Bowker et al. | 356/71 |
| 6,289,114 B1 * | 9/2001 | Mainguet | 382/124 |
| 6,301,376 B1 * | 10/2001 | Draganoff | 382/124 |
| 6,483,932 B1 * | 11/2002 | Martinez et al. | 382/124 |
| 6,628,377 B1 * | 9/2003 | Sabatini et al. | 356/71 |
| 6,791,923 B2 * | 9/2004 | Sekiya et al. | 369/47.5 |
| 6,795,570 B1 * | 9/2004 | Eichhorn et al. | 382/124 |
| 6,917,694 B1 * | 7/2005 | Machida et al. | 382/124 |
| 2002/0012455 A1 * | 1/2002 | Benckert | 382/124 |
| 2003/0161510 A1 * | 8/2003 | Fujii | 382/124 |
| 2005/0047631 A1 * | 3/2005 | Zyzdryn | 382/124 |
| 2006/0210120 A1 * | 9/2006 | Rowe et al. | 382/115 |

FOREIGN PATENT DOCUMENTS

| | | |
|---|---|---|
| DE | 100 24 559 | 11/2001 |
| WO | 97/41528 | 11/1997 |
| WO | 99/56236 | 11/1999 |

* cited by examiner

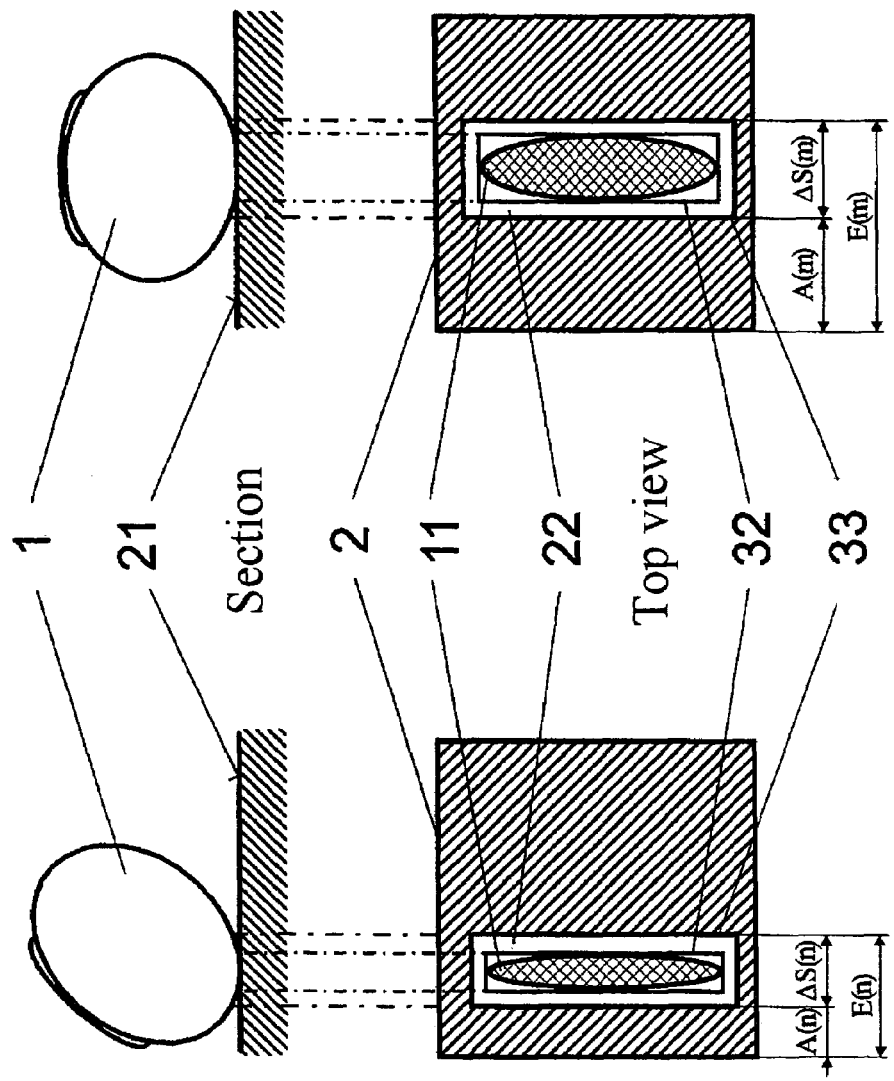

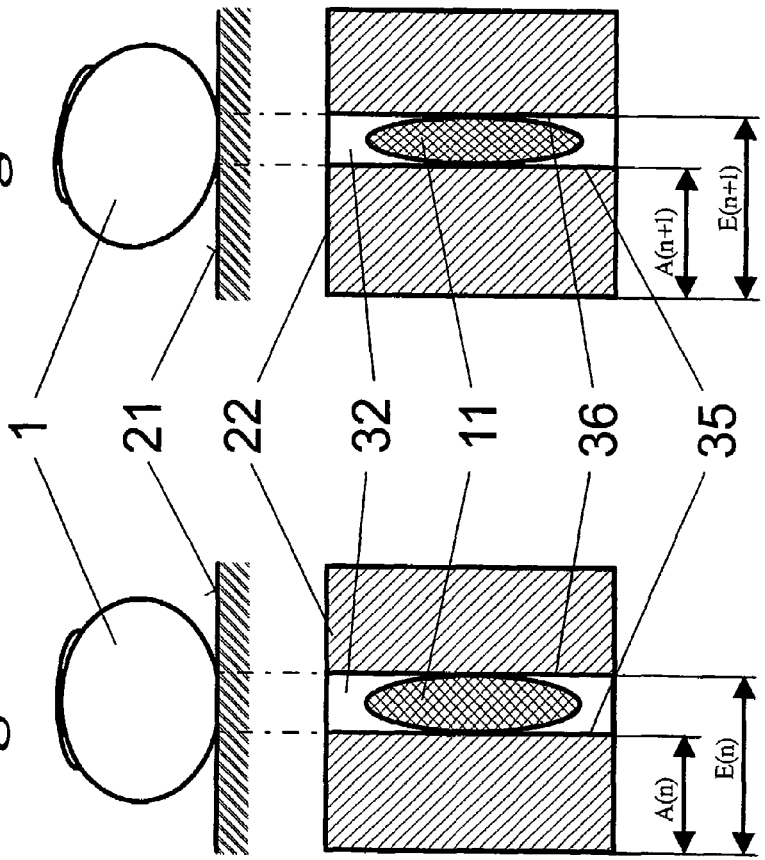

METHOD AND ARRANGEMENT FOR ELECTRONIC RECORDING OF ROLLED FINGERPRINTS

CROSS-REFERENCE TO RELATED APPLICATION

This application claims priority of German Application No. 103 58 738.1, filed Dec. 11, 2003, the complete disclosure of which is hereby incorporated by reference.

BACKGROUND OF THE INVENTION a) Field of the Invention

The invention is directed to a method and an arrangement for the electronic recording of a moving object, particularly for recording a finger that is rolled on a support surface. The invention is applied chiefly for preparing electronic fingerprints but can also be advantageously used in object tracking for intelligent control of a sampling window that is variable with respect to position and/or size.

b) Description of the Related Art

The basis for the use of fingerprinting in criminology lies in the uniqueness of dermal ridge images which are not inheritable and which are inalterable from the fourth month of embryonic life until their dissolution following death. The master image may be the finger itself, a fingerprint made upon paper by ink, or a trace photogram. The latter two techniques were and are used primarily by police. It is possible to automate the identification and verification of fingerprints by means of pattern recognition techniques which are capable of extracting the characterizing features of a fingerprint.

In recent years, the techniques mentioned above have increasingly been integrated into electronic systems which permit direct recording of the finger. This shortens recording and evaluating times so that the quality of the images can be improved at the same time. Therefore, when a finger is not correctly recorded, it is possible to repeat the process of recording this finger immediately.

Electronic image recording of fingerprints is usually carried out with matrix sensors or line sensors based on CCD or CMOS technology. In so doing, the fingerprint, as master image, is converted through special optics and sensors into an electronic image and is subsequently digitized to form a screen image with a fixed spatial and gray value resolution.

However, capacitive, thermal, ultrasound-based or pressure-sensitive sensors can also be used for electronic recording of fingerprints.

Besides flat printing of the finger, images of rolled fingers, above all, are also made by police. The procedure for producing rolled fingerprints with ink and paper is sufficiently simple: ink is applied to the finger and the finger is then rolled on paper. In so doing, rotation and deformations or smearing at the ends of the finger are accepted and permissible.

This procedure is somewhat more involved in electronic systems. In this case, depending on the manner in which the finger is electronically acquired (with line or matrix), a total image is put together from many individual images. In this connection, there is the problem that, in contrast to rolling with ink on paper, there is not a complete recording but rather a plurality of discrete-time samples which involves a loss of information. Apart from the deformation of the finger and the resulting changes at two different points in time, the reasons for the loss of information reside particularly in that the duration of the scan of the finger by the image recording unit is too short. This means that in order to ensure that a finger is correctly recorded, the image recording unit—depending on the method of composition that is employed—must have a minimum image rate so that interfering processes such as twisting or slipping during the process of rolling the finger can be detected.

Methods for arriving at a total image with minimal errors based on the inevitable individual images in which the generation of the image of a rolled finger is always preceded by a successively recorded series of individual electronic images have been described many times. The total image is put together from these individual images by means of many different methods in which the individual images are divided into slices or strips.

In U.S. Pat. No. 4,933,976, U.S. Pat. No. 5,230,025, U.S. Pat. No. 6,483,932, WO 97/41528 and DE 198 51 544 C1 (WO 00/28470), a strip is taken from each of the individual images and the total image is assembled from these strips. The patents mentioned above are distinguished from one another by the different algorithms by which the strips are determined and assembled in order, as far as possible, to join only those parts of the individual images that correspond to the actual contact surface of the finger.

In all of the references mentioned above, the individual images coming from the image recording unit have a fixed size and are based on a fixed time regime (given by a clock generator or an event trigger). Accordingly, the rolling speed (and possibly a change in the rolling speed) and the size of the finger contact surface (and real changes in the latter during the roll processes) cannot be taken into account in the readout regime of the image recording unit.

In order to make it possible to correctly calculate the resulting image, two adjacent fingerprint strips must have an intersect that is sufficiently large for the method in question. This can be achieved only when a fast, timed sampling is carried out while the finger is rolled. Currently, this is realized by means of sensors with a high image readout speed (image rate) of more than 25 images/second +. However, technical limitations are encountered when the spatial resolution is increased (e.g., from 500 dpi to 1000 dpi). Either the image rate is decreased (e.g., image rate reduced to ¼ when changing from 500 dpi to 1000 dpi) or the price of the sensor, including its electronics, is prohibitively high.

+ [(I/S), usually known as frames per second (fps)]

OBJECT AND SUMMARY OF THE INVENTION

Therefore, it is the primary object of the invention to find a novel possibility for electronic recording of rolled fingerprints which enables high-resolution individual images and a close sequence of images for joining the individual images without gaps to form a total image without resorting to expensive image sensors with high image rates (readout speed).

In a method for the electronic recording of a moving object, particularly for recording a finger rolled on a recording surface, wherein the object is detected along with its structures in a series of individual images during the movement by means of a spatially resolving image recording unit and processed as a two-dimensional electronic image, the above-stated object is met, according to the invention, in that an outline or shape surrounding the object is determined from the position and size of the object in at least one of the individual images read out from the image recording unit, in that a rectangle which is enlarged by tolerance allowances and which is oriented parallel to the row direction and column direction of the sensor is determined from the surrounding shape, and in that the enlarged rectangle is used to predict and adjust the size and position of an active pixel area of the image recording unit for at least one image to be read out subsequently, so that the read out active pixel area of the image recording unit is always kept small due to its adaptation and a higher image rate is realized in the sensor readout or data transfer.

The surrounding shape of the object image of the currently scanned image is advantageously determined by a gradient image formed in the column direction and in the row direction. The gradient image for each pixel is generated by taking the differences between adjacent gray values in the row direction or in the column direction.

In this connection, in order to prepare every pixel of the gradient image the difference between adjacent gray values is advisably taken from the gray values of the precursor pixel and successor pixel of the currently examined pixel of the row or column.

For a particularly reliable extraction of the edges of the fingerprint, the pixels of every gradient image are preferably formed from the difference between the gray values of the pre-precursor pixel and post-successor pixel of the currently examined pixel of the rows or columns.

For a current image, the start value and end value of the shape surrounding the object image are advantageously determined from at least one gradient image of the rows or columns that is oriented in direction of the object movement, wherein a first significant difference and a final significant difference between adjacent gray values is determined for every row or column for calculating the start value and end value of the shape surrounding the object.

The significant differences are advisably determined by means of exceeded threshold values.

It has proven advantageous to calculate a mean value or a median value from the start values and end values determined from the gradient image in at least one dimension corresponding to the principal movement direction of the object; the mean values or median values then form linear boundaries of a rectangular shape surrounding the object image.

In a preferable embodiment, the start values and end values at least from the gradient image corresponding to the principal movement direction of the object are plotted in a spatial histogram, wherein the locations at which the integral frequency distribution reaches a significant threshold value form the boundaries of a rectangular shape surrounding the object image. This threshold value can reasonably be 5% of the integral frequency distribution. However, it is also possible to choose the maximum value of the frequency distribution.

In order to economize on computing capacity and storage capacity, it has proven advantageous to use only the start values and end values of selected rows or columns of the gradient image to determine the boundaries of the surrounding rectangular shape.

In order to prevent cropping of the object image, different tolerance allowances are determined for generating the enlarged rectangle, advisably depending on a detected movement course of the object, wherein different evaluation algorithms from at least two previously read out images based on the time change of the boundaries of the surrounding shape in the successive images are applied after determining the boundaries of the respective surrounding shape.

A finger rolling on a recording surface is preferably acquired as object, wherein a fingerprint is recorded as object image in every read out image as instantaneous support surface of the finger.

In so doing, the following steps are advantageously applied to each of the read out images in order to adjust the boundaries of the individual images:

a put-on recognition routine which stops the calculation of the tolerance allowance and subsequent prediction and adjustments of the active pixel area of the image recording unit when an insufficient quantity of difference values resulting from a fingerprint is determined;

a movement tracking routine which determines a uniform tolerance allowance on all sides around the boundaries of the surrounding shape when the movement of the shape surrounding a fingerprint is not clearly directed, the size of the tolerance allowance being selected in such a way that the enlarged rectangle does not cut off the object within the time period of the readout of at least a next image during any movement of the object to an extent typical for the object; and a roll tracking routine is initiated when the boundaries of the surrounding shape have shifted appreciably in a pronounced direction in a defined quantity of successive images, wherein a tolerance allowance for the boundary of the surrounding shape moving in the movement direction of the object is determined from a calculated speed of the moving boundary such that the enlarged rectangle does not cut off the instantaneous object image (fingerprint) within the time period of at least one image that is read out subsequently.

Since the roll tracking routine lies at the heart of the image recording of a rolled finger in order to provide a complete and highly time-resolved series of individual images for assembling the complete print of a rolled finger, the roll tracking is advisably initiated by a roll start recognition, which switches the movement tracking to roll tracking when there is a determined fixed number of displacements of the boundaries of the surrounding shape proceeding in the same direction, and is terminated by a roll end recognition which interrupts the roll tracking when the movement of the boundaries of the surrounding shape reverses direction.

When a finger is rolled along a recording surface, a buffer storage of all of the images used for the start recognition is advantageously carried out within the roll start recognition in order to keep the images that were already read out available for subsequently assembling the complete rolled finger.

Further, in an arrangement for the electronic recording of a moving object, particularly for recording a finger rolled on a recording surface, with an image recording unit for recording a series of two-dimensional individual images of a moving object, wherein the individual images have spatial overlapping for putting together a total image of the moving object, the object of the invention is met, according to the invention, in that a logic unit for the continuous calculation of a limited pixel area which closely encloses the object image on the basis of at least one image that was read out previously by the image recording unit is arranged downstream of the image recording unit, in that a program storage, a data storage, a processor and an interface are associated with the logic unit, the processor being provided for controlling the data flows, and in that the interface for the data transfer of the images which are controlled in a defined manner by the logic unit with respect to the size and position of their pixel area is provided at an external computer unit, wherein the computer unit contains the image processing for putting together the images recorded successively over time to form a total image.

The image recording unit preferably has an optoelectronic sensor, but can also be outfitted with a capacitive, inductive, thermal, ultrasound or other contact sensor. CCD arrays or CMOS arrays (both in a matrix or line arrangement) are advisably used as optoelectronic image recorders.

The image recording unit can advantageously also contain a sensor with a low image rate (<25 1/s), wherein the low image rate refers only to the readout of all pixels of the sensor, the readout of images from an active pixel area which can be programmed in any way but which can be realized with a substantially higher image rate.

In an expanded variant of the invention, the image recording unit preferably has a large-area sensor in which a complete footprint or handprint can be realized with high resolution but with a low image rate by means of one individual sensor readout, in which a defined partial area of the recording surface is determined for the recording of individual rolled fingers, wherein the sensor can be controlled for reading out pixel-reduced images in a correspondingly limited active pixel area which is associated with the defined partial area of the recording surface for the finger to be rolled, so that the image rate for recording rolled fingerprints is substantially increased compared to the recording of footprints or handprints.

In a modified variant of the invention, the image recording unit can also be a sensor with a high image rate ($\geq 25$ I/s) in which the interface is the limiting element of the data transfer, so that only a small portion of the image data can be transmitted in real time. In this case, the readout of data-reduced images, according to the invention, is carried out from any accessible pixel areas of the data storage in order to subsequently increase the data rate of the transmission via the interface.

The process, according to the invention, for determining the boundaries of the active pixel area advantageously takes place in a logic unit (hardware) that is arranged upstream (of the computing unit for assembling the images of the object) and is advisably a FPGA (Field Programmable Gate Array). A PLD (Programmable Logic Device) or an ASIC (Application-Specific Integrated Circuit) can also be used as logic unit.

The processor used for controlling the processes and data flows of the logic unit can advantageously be a microprocessor (MPU), a digital signal processor (DSP) or a microcontroller (MCU). The processor can also be integrated directly in the logic unit, program storage or external computer unit.

The invention is based on the idea of electronically recording a gray value image of various surface sizes and/or surface structures which can be displayed as a function $G(x,y)$, wherein x and y designate the coordinates of a respective image point of the image and G designates its gray values. A moving object with image characteristics of this kind is recorded sequentially over different points in time $t_n$, where $t_{n+1} > t_n$, with different views as a function $G_n$ in order to form the total image G from images $G_n(x,y)$, wherein only relevant pieces of the object surface whose size varies as a function of the rotating speed of the object are recorded by the image recording unit.

The essence of the method according to the invention consists in defining or predicting an adapted, limited pixel section from every image actually read out for the next respective image, which pixel section completely contains with the necessary certainty the fingerprint to be acquired, in order to increase the readout rate (image rate) of the image recording unit. In this way, it is possible to use inexpensive sensors which would not otherwise satisfy the required high image rate of $\geq 25$ I/s for reading out complete individual images but which have a WOI (Window of Interest) adjustability and accordingly have the full spatial resolution. In CMOS technology, depending on the manufacturer, this application is called "window of interest" or "region of interest", "active window" and "windowing". In CCD technology, the term "fast dump" is used to signify the skipping over of rows and "overclocking" is used to signify overclocking of unnecessary columns.

By means of the invention it is possible to realize an electronic recording of rolled fingerprints which generates high resolution images in close sequence that are adapted to the size and the movement of the object and allows the images to be put together reliably to form a total image without having to resort to expensive image sensors or interfaces with high image rates. The invention makes it possible to select much higher image rates than would be possible with the high-resolution sensors or image processing interfaces currently in use with complete readout of the image surface. Further, due to the electronic adaptation of the sensor readout window, applications such as the recording of a complete hand and the rolling of a finger are possible in one and the same apparatus.

The invention will be described more fully in the following with reference to embodiment examples.

BRIEF DESCRIPTION OF THE DRAWINGS

In the drawings:

FIG. 10 is a schematic view showing the rolling of a finger to illustrate the different size of the fingerprint, the surrounding shape, and the enlarged rectangle;

FIG. 11 is a schematic view showing the process of rolling a finger for clarifying the determination of speeds and accelerations of the boundaries of the shape surrounding the fingerprint;

DESCRIPTION OF THE PREFERRED EMBODIMENTS

Figure 1:
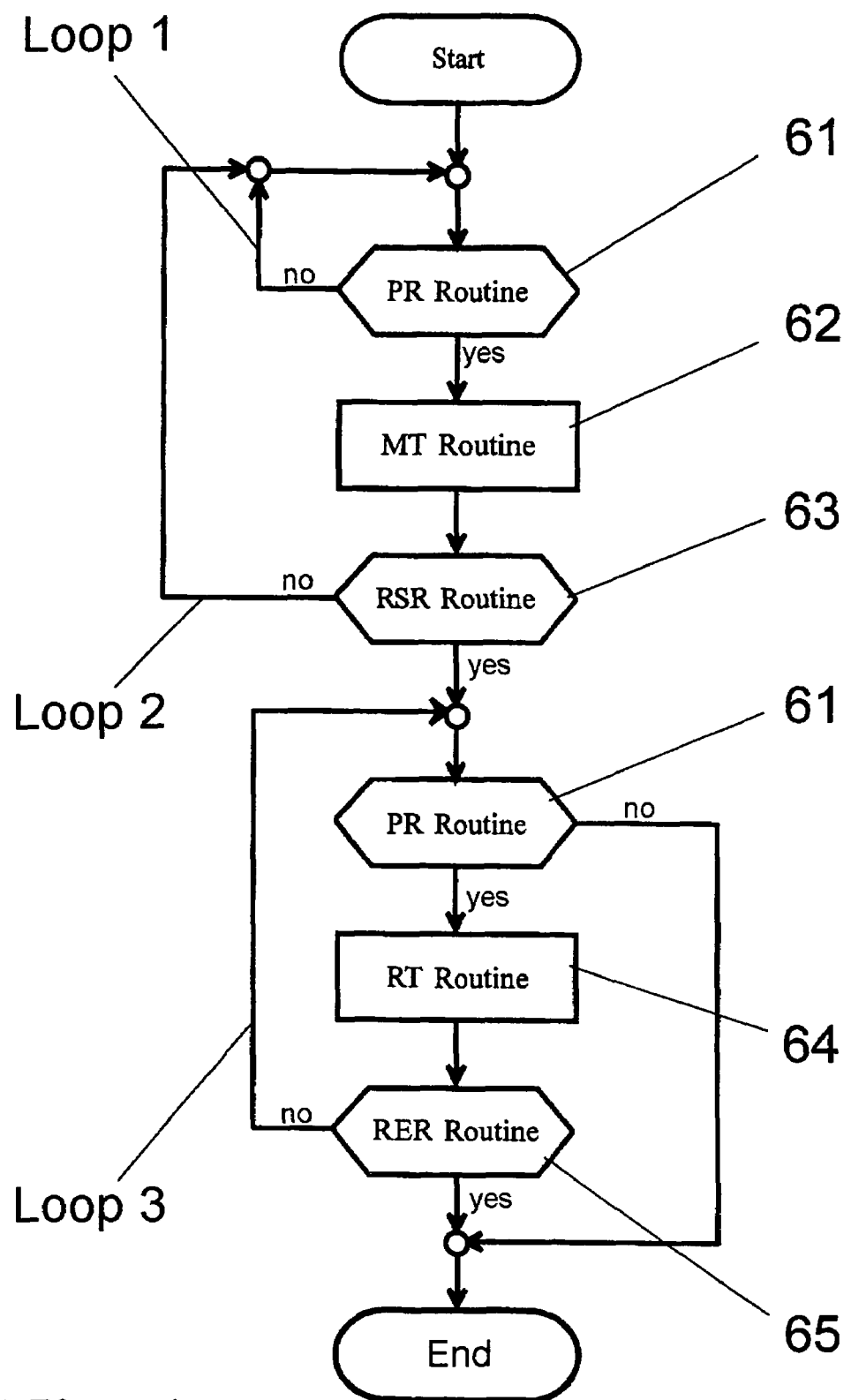
FIG. 1 shows a schematic diagram of the method according to the invention.

FIG. 1 illustrates the basic principle of the method for the electronic recording of a printed image (hereinafter: fingerprint 11) of the surface of a finger 1. The basis of the method consists in that a finger 1 is recorded sequentially over different points in time in different, mutually overlapping views and so that a total image of the finger can be put together subsequently—which is not the subject of the invention.

Due to the above-mentioned rules for rolling the finger 1, the finger surface can only be recorded piece by piece as a successive series of individual images by the image recording unit 2. The size and position of the recorded images 31 vary depending on the actual printed surface and the rolling speed of the finger 1. In addition, a complex control process is suggested for adjusting and monitoring an adapted, limited section in the readout of the image recording unit 2 depending on the actual print surface and the rolling speed of the finger 1 so that high image rates can be achieved without resorting to expensive image sensors.

Figure 4:
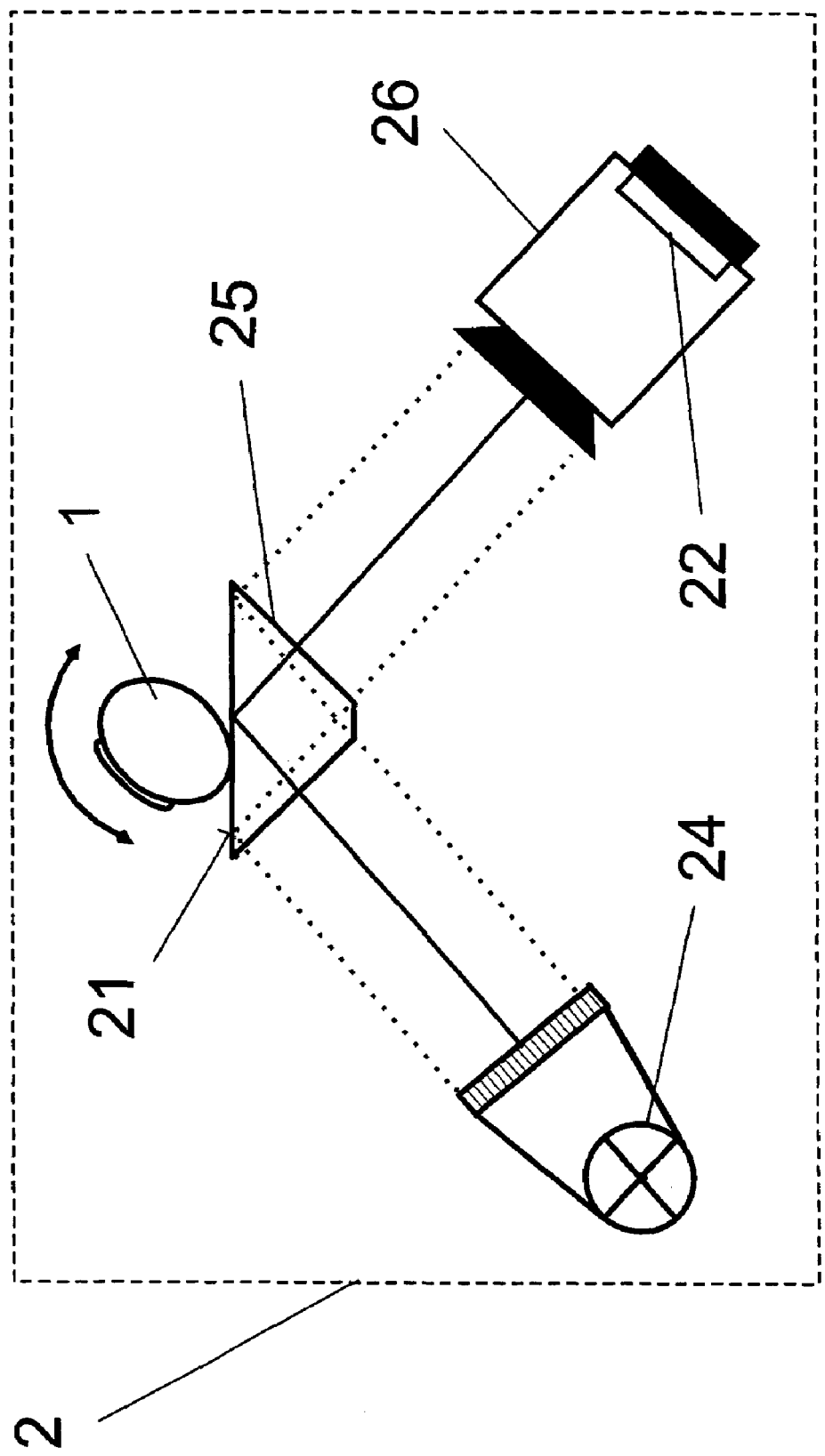
FIG. 4 shows a schematic view of an optoelectronic arrangement for obtaining fingerprints of a finger rolling on a recording surface.

In contrast to rolling an inked finger 1 on paper, a continuous recording of the roll process does not take place when rolling on an optoelectronic image recording device such as that indicated by way of example in FIG. 4, rather discrete-time sampling is carried out.

Figure 2:
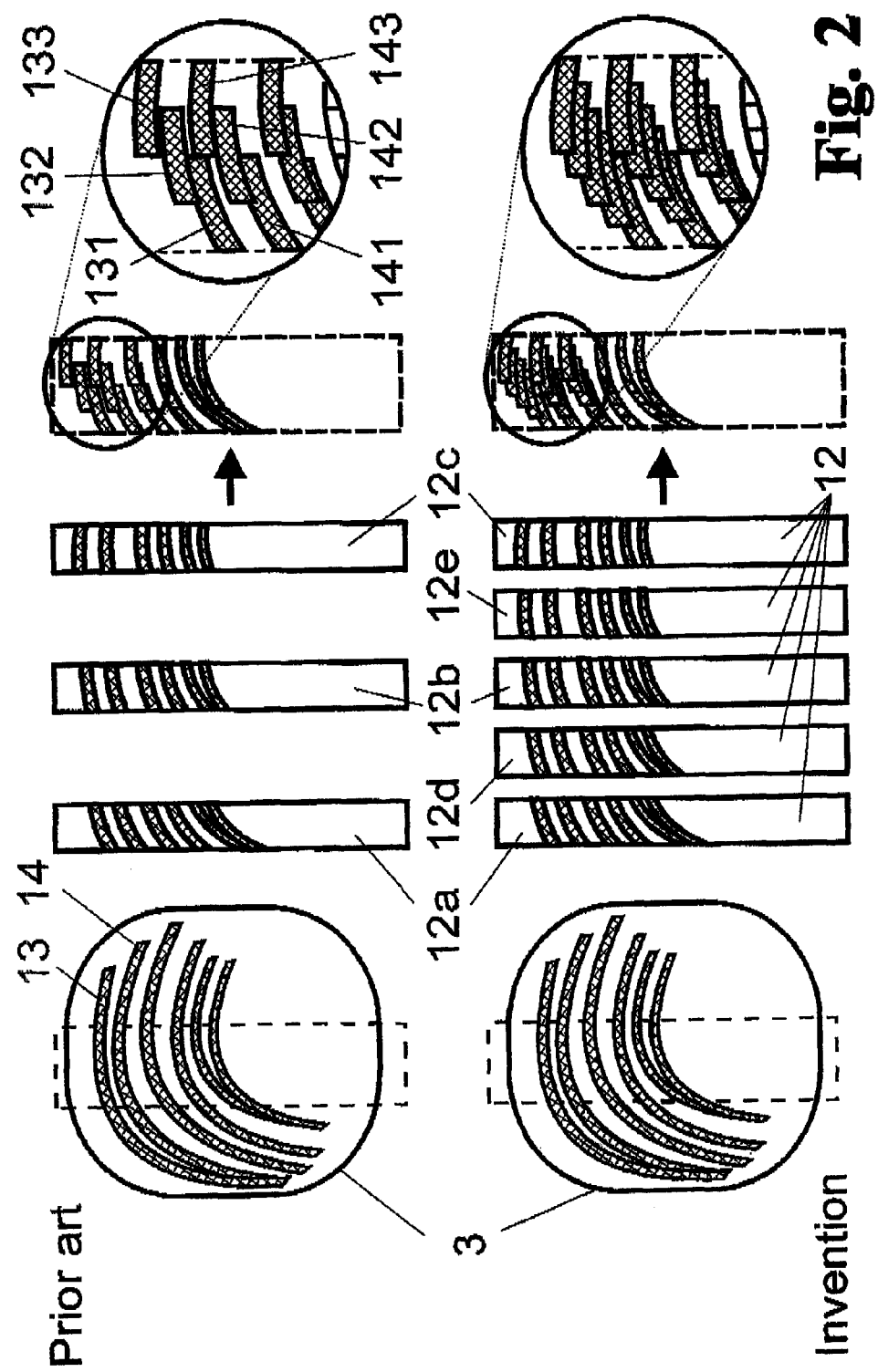
FIG. 2 shows the prior art for putting together individual images of a rolled finger due to insufficient sampling density of the individual images.
Figure 3:
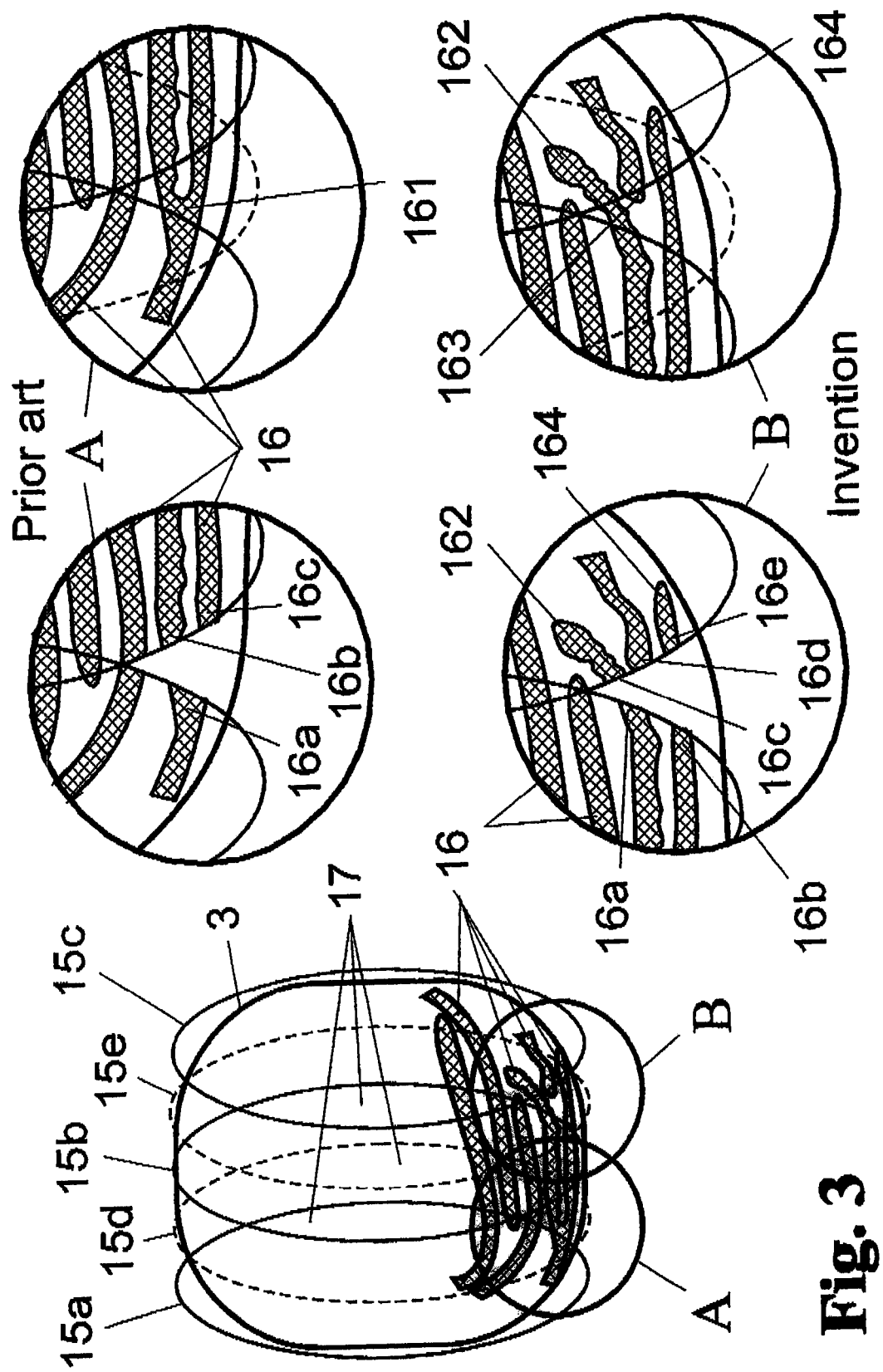
FIG. 3 illustrates the problems of the prior art in putting together papillary ridges of a rolled finger due to missing overlapping of the individual images.

In order to clarify the invention, it is compared with the prior art which is shown schematically in FIG. 2 and FIG. 3. According to the conventional procedure, an image recording unit 2 which can be read out, e.g., at 25 I/s takes 75 images during a roll process lasting 3 seconds. Each of these 75 images is a complete image containing the fingerprint 11 at a defined point in time in a determined position (size and position). In order to generate a total image 3 of the rolled finger 1 from these individual images, determined image slices or strips 12 representing the portions of the read out image containing relevant information for combining are cut out of these individual complete images. Two adjacent image strips 12 must have a sufficiently large intersect of the fingerprint 11 in order to carry out a correct calculation of the total image 3. A common method for putting together two image strips 12 is cross correlation and overlapping knitting together of the two image strips 12 at the point of greatest coincidence of the edge areas. However, discrete-time sampling involves a loss of information that is caused by the deformation and movement of the finger 1 and the resulting changes in the image of the fingerprint 11 at two different time points of the recording. This loss of information increases when the rolling speed of the finger 1 is increased relative to the image rate of the image recording unit 2. This means that in order to ensure that a finger 1 is recorded correctly, the image recording unit 2 must meet a minimum image rate for combining so that, e.g., processes such as twisting or slipping during the roll process can be detected and corrected.

In order to illustrate the problems occurring when the readout speed of the image recording unit 2 is too slow, the results of a total image 3 of a rolled finger 1 which occur when rolling the finger 1 with ink on paper and which are to be generated as a total image 3 by combining a sequence of individual images are shown in the partial view on the left-hand side of FIG. 2.

According to the detailed recordings of a finger 1 shown in the top right-hand row, the total image 3 is to be assembled from three images per time interval. According to the prior art, a series of three instantaneous recordings of the finger 1 are sampled as a complete image of the entire image recording unit 2 in a fixed time regime. Portions of the image containing information are then extracted, resulting in the three image strips 12a to 12c shown in the drawing. When the time interval between the instantaneous recordings is too long (i.e., the image rate of the image recording unit 2 is too low) compared to the movement of the finger 1, correlation problems result when assembling the total image 3, even when there is overlapping of the edge areas of the image strips 12a to 12c, in the event that during the rolling movement the finger 1 was displaced or turned lateral thereto in addition.

In this scanning example, the two upper papillary ridges 13 and 14 have executed a translational movement and the uppermost papillary ridge 13 has undergone a rotational movement in addition. In the enlarged detail at top right, it is clear that the first segment 131 of the papillary ridge 13 from strip 12a is located closer to the third segment 143 of the next papillary ridge 14 from strip 12c than the associated second segment 132 of the top papillary ridge 13 from strip 12b. This can result in an incorrect combination of at least papillary ridges 13 and 14 in the total image 3 and, therefore, in an erroneous interpretation of the structures of the rolled finger 1.

The combination in the lower row of detailed views in FIG. 2 which represent scanning at a higher image rate is clearly superior in that five images per time interval are used. The five image strips 12a to 12e extracted therefrom make it possible to detect the displacing and rotating movements superimposed on the rolling of the finger 1 simultaneously and accordingly to achieve an unambiguous, correct combination of strips 12a to 12e in the total image 3, since skipped papillary ridges from one image strip 12 to the next are limited to a great extent and can therefore be extrapolated.

However, there are limits to an optional increase in the image rate because of the relatively large recording surface 21 of the image recording unit 2 that is required for rolling the finger 1, these limits resulting above all from the cost of sensors which rises disproportionately as the image rate increases.

FIG. 3 shows another problem caused by the image readout speed being too slow in that the instantaneous surface of the fingerprint 11 presents in each instance an elliptical surface per individual image readout. The ellipses 15a, 15b and 15c shown in solid lines illustrate the contents of the print images that are spaced too far apart in time with a conventional readout of inexpensive image sensors, while an increased image rate by additional intermediate scans is represented by ellipses 15d and 15e shown in dashed lines as are achieved, according to the invention, with inexpensive sensors or, according to the prior art, only with very expensive sensors.

The greatest change from one individual image recording to the next—caused by the finger geometry—occurs in the upper and lower edge areas of the fingerprint 11. Accordingly, the intersect between two recordings is smallest at the edge area. When characterizing features such as papillary ridge branching 161 or papillary ridge terminations 162, 163 and 164 are found outside the fingerprint surfaces succeeding one another in time which are shown as ellipses 15a-c in solid lines, as is shown schematically in FIG. 3, papillary ridges 16 are accordingly interrupted in such a way that the ridge cutoff 16a of the first ellipse 15a can no longer be definitively connected to the ridge cutoffs 16b and 16c of the next ellipse 15b of the instantaneously captured fingerprint 11 in a resulting image (detailed views at right in FIG. 3).

It can be clearly seen from the enlarged detailed views in FIG. 3 that there is, in each instance, a cut area 17 between the two adjacent ellipses in solid lines 15a, 15b and 15b, 15c respectively (as schematic instantaneous fingerprints 11) which does not extend over the entire width of a cut out image strip 12 described in FIG. 2, so that areas of the papillary ridges 16 lie outside of the joined total surface of the ellipses 15a, 15b and 15c. In the circular detailed views shown at left, two such areas are selected and enlarged to illustrate the case in which the image rate is too low and therefore only encompasses the ellipses 15a to 15c in solid lines.

In the detailed view in the top left portion, the combined total image 3 appears to have gaps after optimal correlation of the ellipse areas 15*a-c*. The branch 161 is imaged as three features (ridge terminations) instead of one feature when the fingerprint areas 15*a-c* are joined and is accordingly corrupted. Even with a coherence analysis, it cannot be made clear whether this is a branch, a ridge continuation and ridge termination, or actually three terminating ridges.

The detailed view at bottom left in FIG. 3 shows another critical area of the rolled finger 1 between the ellipses 15*b* and 15*c* in which two papillary ridge terminations 162 and 163 and a papillary ridge termination 164 which is located in the scan gap are visible in the complete total image 3. This combined resulting image with gaps shows five ridge cutoffs 16*a* to 16*e* which appear as five ridge terminations and do not allow any conclusions to be drawn about whether or not they belong together in some way. In this case, with coherence analyses it is only possible to speculate about whether the ridge cutoffs 16*a* to 16*e* are:

- a simple branch from ridge cutoff 16*a* to ridge cutoffs 16*c* and 16*d* or from ridge cutoff 16*b* to ridge cutoffs 16*d* and 16*e* and a continuous ridge from 16*b* to 16*e* or from 16*a* to 16*c*; or
- a continuous ridge from ridge cutoff 16*a* to 16*c* or 16*d* or from 16*b* to 16*d* or 16*e* and three ridge terminations are to be anticipated; or
- two continuous ridges from ridge cutoffs 16*a* and 16*b* to 16*c*, 16*d* or 16*e* and a ridge termination at one of the ridge cutoffs 16*c* to 16*e*.

The complete, correct total image 3 can be obtained only by means of a higher image rate, represented by an intermediate scan of the finger 1 between print ellipses 15*b* and 15*c* that is shown as an ellipse 15*e* in dashed lines, i.e., when the image rate of the image recording unit 2 is approximately doubled. This scan situation of the finger 1 is shown in the detailed view at bottom right in FIG. 3 and again, according to the prior art, leads to the requirement for extremely expensive image sensors with high resolution and a substantially higher (e.g., doubled) image rate.

FIG. 4 shows an image recording unit 2 for optoelectronic image recording of a finger 1 using the principle of frustrated total reflection at a recording surface 21. In a conventional basic construction, the image recording unit 2 comprises a diffuse illumination unit 24, a prism 25, and a camera 26 with imaging optics and an optoelectronic sensor 22. According to this principle, the base surface of the prism 25 is the actual recording surface 21. The light is coupled into the prism 25 by the illumination unit 24 in such a way that it is totally reflected at the base surface when a finger 1 is not placed on it, i.e., when the critical angle for total reflection (in this case: glass/air) is exceeded. Therefore, a brightly illuminated image is generated by means of the imaging optics on the sensor 22 in the camera 26. When a finger 1 is placed on the prism 25, the glass-to-air transition changes to a glass-to-skin transition at those points where the finger 1 is applied. Since the skin has a higher index of refraction than air, the critical angle of the total reflection is greater. The total reflection is accordingly canceled at these places and the light is coupled out. Therefore, the finger 1 is imaged on the sensor 22 arranged in the camera 26 as an image in black-to-white transitions. The sensor 22 converts these light intensities into electrical signals which are subsequently digitized, so that a screen image with a defined spatial and gray value resolution results.

The optoelectronic image recording of fingerprints 11 is carried out—without limiting generality—by matrix sensors or line sensors based on CCD or CMOS technology.

In the arrangement in FIG. 4 that was described above, the bottom side of the prism 25 is the recording surface 21 for the finger 1. In the following, for the sake of simplicity—and without limiting to the image recording principle described above—only the recording surface 21 and the image recording unit 2 are referred to for purposes of illustrating the invention. The rolled finger 1 is converted to an electronic image and read out in digital form in the image recording unit 2 in any manner desired.

Instead of an optoelectronic sensor 22, it is also possible to use capacitive, pressure-sensitive, ultrasound-based or thermal sensors in an equivalent manner within a suitably designed image recording unit for recording fingerprints 11.

Figure 5:
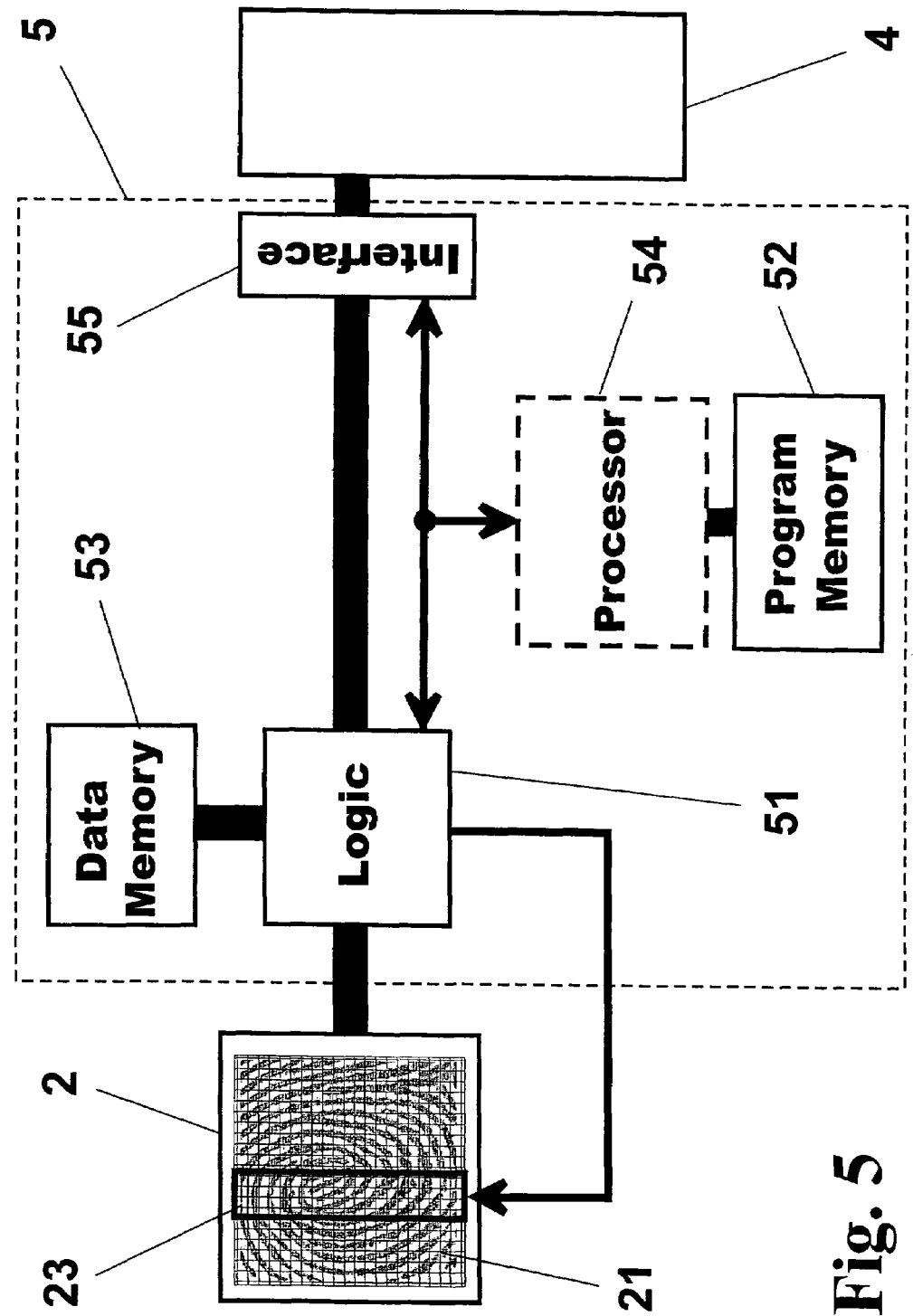
FIG. 5 shows the basic arrangement of the control hardware, according to the invention, for preparing the active pixel area for reading out adapted images which safely enclose the actual fingerprint.

The method according to the invention which is preferably realized as hardware in an arrangement according to FIG. 5 takes into account different object surfaces and object speeds and accordingly provides for an optimally adapted scan of the moving object.

As is shown in FIG. 1, the method for recording a rolled finger 1 can be separated into the following method steps:
- put-on recognition 61 (PR routine 61),
- movement tracking 62 (MT routine 62),
- roll start recognition 63 (RSR routine 63),
- roll tracking 64 (RT routine 64), and
- roll end recognition 65 (RER routine 65).

The starting point of the method, as is shown in FIG. 1, is information (in any form) which conveys that a roll process is to take place. This information is generally conveyed by an external computer unit 4 which processes the recorded data. However, the information can also be given by another external system which communicates with the arrangement according to FIG. 5 via the interface. Through this transmitted information, the arrangement knows that a finger 1 will shortly be applied and initiates appropriate recognition steps.

The following recognition steps of the method proceed upon this activation:

Put-On Recognition 61 (PR Routine)

The aim of the PR routine 61 is to check in each image 31 supplied by the image recording unit 2 whether or not a valid fingerprint 11 is present on the support surface 21. In so doing, an x-gradient image 71 and a y-gradient image 72 are generated from every image 31 by taking differences between adjacent gray value pixels in every row or column.

Figure 6:
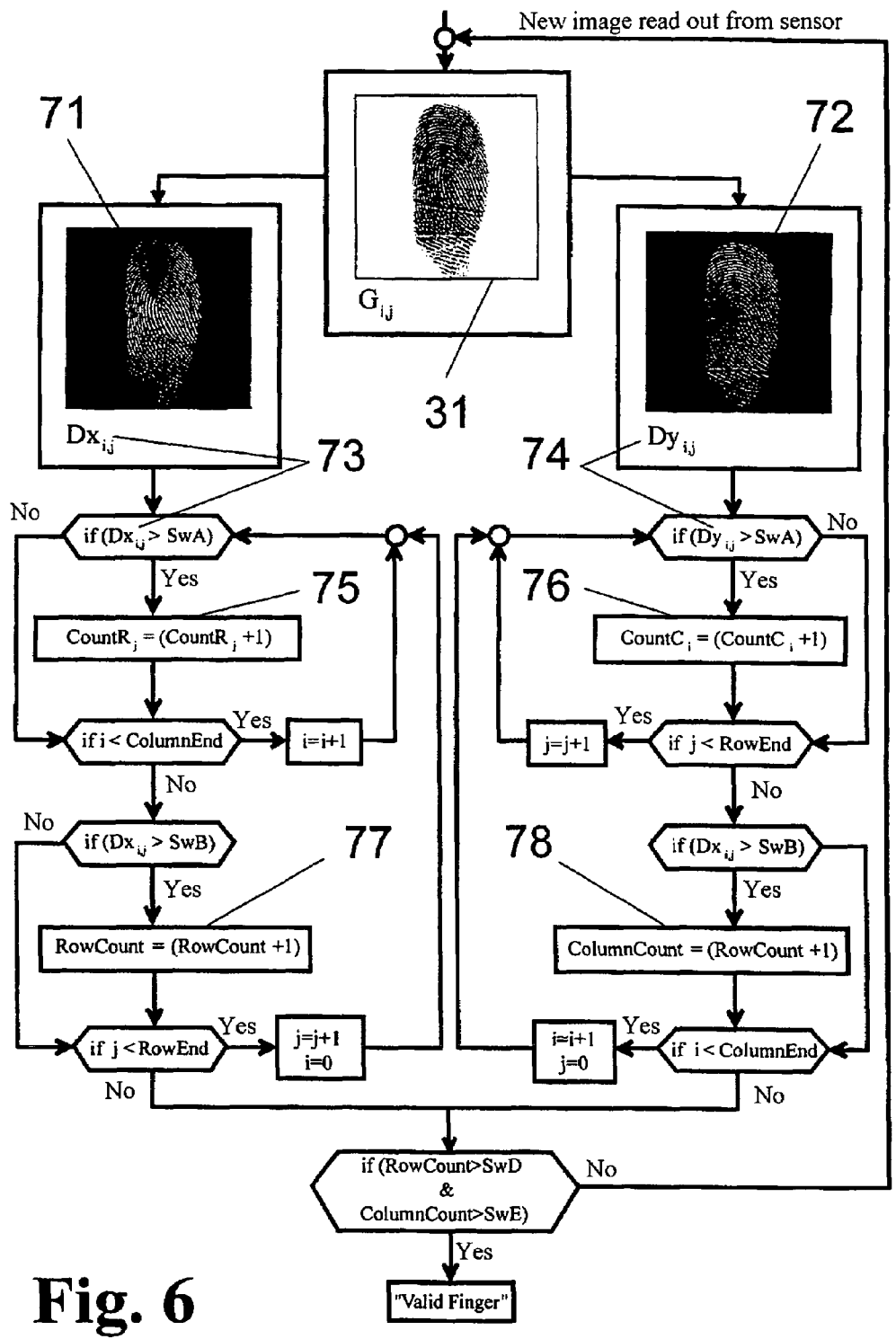
FIG. 6 shows a flowchart for a put-on recognition routine.

FIG. 6 shows a possible program run for recognizing a "valid fingerprint". This program run is directed to an individual image 31 within a series of images in each instance. A gradient image 71 in x-direction with values $Dx_{i,j}$ and a gradient image 72 in y-direction with $Dy_{i,j}$ are formed from every electronically converted image 31 having a gray value distribution $G_{i,j}$ by taking the differences 73 and 74, respectively, between the recorded adjacent gray value pixels in each row and each column. It is possible to take the difference 73 from the direct precursor pixel and direct successor pixel of the associated gray value pixel in the image 31 for every pixel of the gradient image 71 which is actually to be generated within the rows or—in order to improve sensitivity—from the pre-precursor pixel and the post-successor pixel. This is carried out in a corresponding manner for differences 74 in the column direction.

The gradient images 71 and 72 generated in this way are searched for difference values 73 and 74 which exceed a determined gray value threshold SwA. The gray value threshold SwA defines a difference value quantity beyond which a difference value 73 or 74 formed from precursor and successor gray value pixels counts as "valid". This gray value threshold SwA need not be rigidly defined, but rather can also vary (change from one image to another) and can therefore better adapt to the image quality of the input image 31.

When the difference is valid, a Variable CountR$_j$ defined in the difference counter 75 for the rows of the x-gradient image 71 or a Variable CountC$_i$ defined in the difference counter 76 for the columns of the y-gradient image 72 are counted up by one.

The criterion is checked and the difference counters 75 and 76 are counted up until the end of the column or row is reached. It is then checked whether or not the respective count in the difference counters 75 and 76 exceeds a minimum threshold. In so doing, the rows or columns whose quantity of valid difference values 73 and 74 determined in the difference counters 75 and 76 exceeds a threshold SwB or SwC and therefore represent valid rows or columns are summed in a row counter 77 for all valid rows (RowCount) or in a column counter 78 for all valid columns (ColumnCount).

The thresholds SwB and SwC can, but need not, have the same size. During a process of rolling the finger 1 in the row direction of the image recording unit 2, the quantity of valid differences 73 per image 31 varies sharply in the row direction. This quantity is smaller at the beginning and at the end of a roll process than in the middle part of the roll process by a factor of approximately 2. On the other hand, the quantity of valid differences 74 in the column direction is relatively constant during the roll process and is on the same order of magnitude as the quantity of valid differences 73 in the row direction during the middle part of the roll process. Therefore, threshold SwC can be selected so as to be greater than threshold SwB. In the present example, both thresholds SwC and SwB were selected so as to be equal in order to be more sensitive for the placement of a finger 1.

When the valid rows and columns have been examined and summed in the row counter 77 and column counter 78 for all rows and columns of the gradient images 71 and 72, a comparison is made as to whether or not the count value of the column counter 77 for the valid columns (ColumnCount) or that of the row counter 78 for the valid rows (RowCount) exceeded a threshold SwD or SwE. In this comparison, the same values are selected for thresholds SwD and SwE for more sensitive checking. In a purely formal respect, however, threshold SwE can be selected so as to be greater than threshold SwD analogous to thresholds SwB and SwC. The decision about whether or not there is a valid finger can also be limited in that only one of the row counters 77 and column counters 78 exceeds the threshold SwD or SwE. When the finger 1 is rolled in the row direction, the column counter 78, for example, is best suited for this purpose. When the output values of the row counter 77 and/or column counter 78 exceeds the threshold value SwD or SwE, a valid finger is present on the recording surface 21 and the movement tracking 62 can be initiated.

Figure 7:
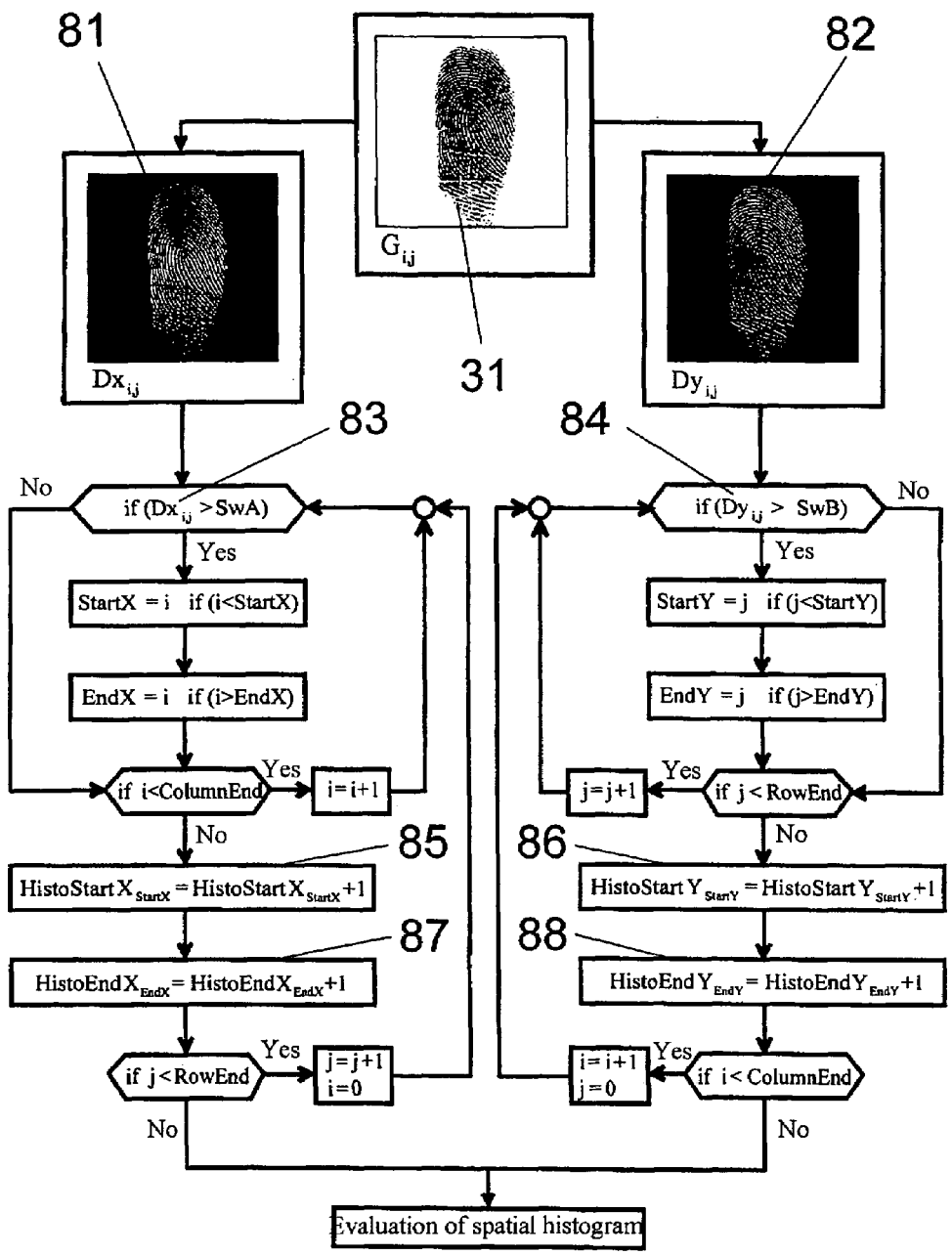
FIG. 7 shows a flowchart for a movement tracking routine for determining the shape surrounding the moving finger by means of spatial histograms.

Movement Tracking 62 (MT Routine):

The MT routine 62, which is shown schematically in FIG. 7, serves to track the position of the actual fingerprint 11 (print surface), which position changes successively as a result of the rolling movement of the finger 1.

The starting point for the evaluation by means of the MT routine 62 can also be given by a switch in the control panel, a footswitch or an external device (e.g., computing unit 4).

In the first run-through of the MT routine 62, the image 31 read out of the image recording unit 2 has the size of the entire active surface of the sensor 22 and is accordingly a complete image. In the subsequent run-throughs—depending on the calculated area size—only one selected active pixel area 23 of the sensor 22 is read out, so that the read out image 31 is a partial image with respect to the total sensor surface.

Figure 8:
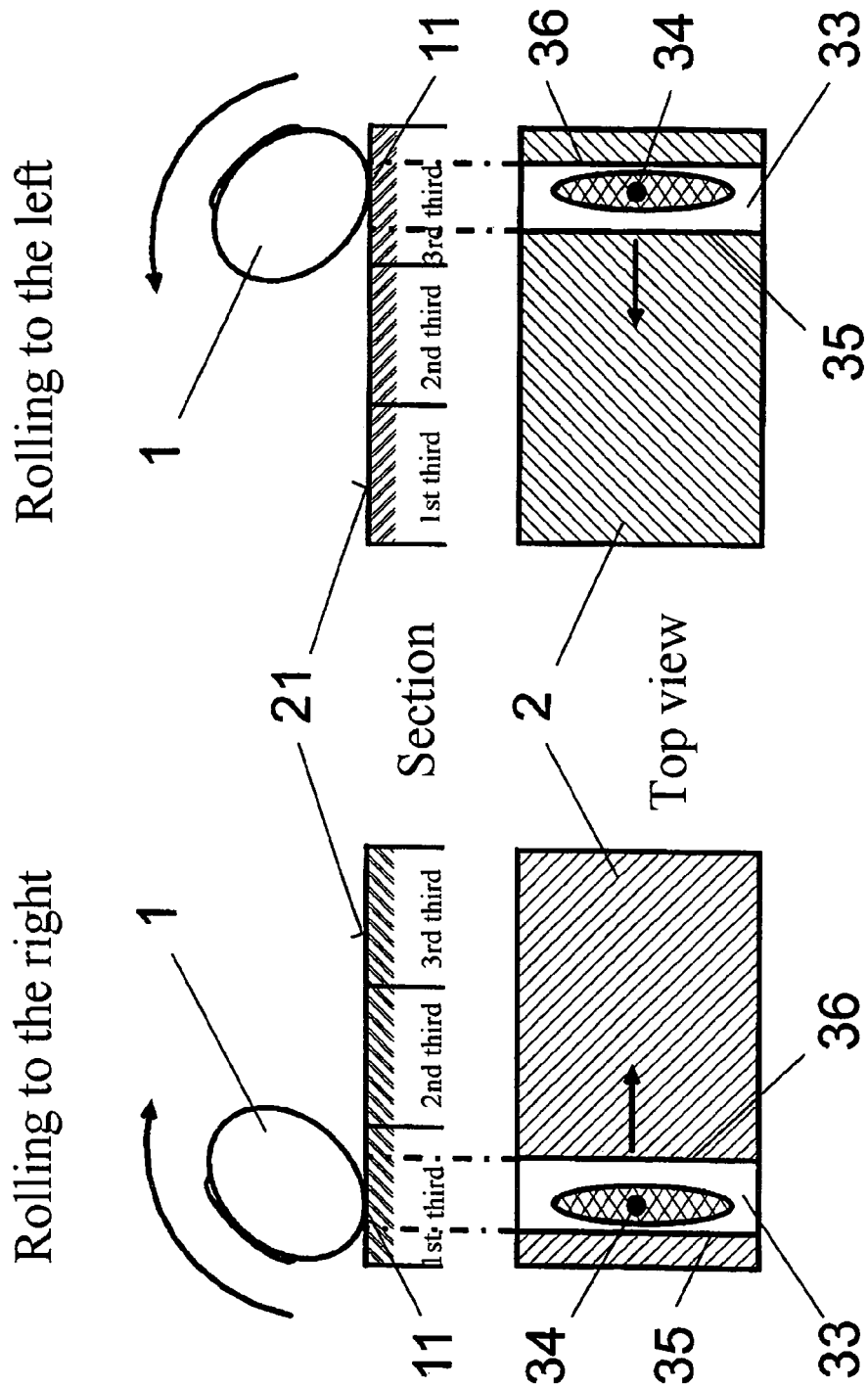
FIG. 8 is a schematic view showing the determination of the start position for the rolling of a finger and sectioning of the recording surface.

The MT routine 62, whose function will be described with reference to FIG. 7 and the schematic views in FIG. 8, serves to track the moving finger 1 in preparation for the defined rolling of the finger 1 after it has been recognized as a valid finger. The position and size of a section of the image 31 with relevant information is recalculated and determined as a pixel sector 23 of the sensor 22 for every adapted image 31 subsequently read out of the image recording unit 2.

In the MT routine 62, which is shown as a flowchart in FIG. 7, a gradient image 81 in x-direction with gray values $Dx_{i,j}$ and a gradient image 82 in y-direction with $Dy_{i,j}$ are calculated from every image 31 having a gray value distribution $G_{i,j}$ or the gradient images 71 and 72 are taken over directly from the PR routine 61. As in the PR routine 61, the difference values are taken from a pixel environment (e.g., difference between precursors of the precursor and successors of the successor of the pixel to be determined).

Valid difference values 83 and 84 which exceed a determined gray value threshold SwA are looked for in these gradient images 81 and 82. The gray value threshold SwA is defined as in the PR routine 61.

In every row or column, the first and last valid difference value 83 and 84, respectively, is determined from these valid difference values 83 and 84 and temporarily stored as StartX or StartY and EndX or EndY. When the end of the row or column is reached, the start values and end values are used in a spatial histogram 85 and 86, respectively, at the pixel position of the start value StartX or StartY and in a spatial histogram 87 and 88, respectively, at the pixel position of the end value EndX or EndY to count up the value at that location by one according to the formula indicated in the histogram box in FIG. 7.

For example, when pixel number 312 of the image 31 has been determined as the start value for the row (from the x-gradient image 81), the value at point 312 in the start value histogram 87 (HistoStartX) is counted up by one. When all histograms (start value histograms 85 and 86 and end value histograms 87 and 88) are determined, the end of the row for determining in x-direction is reached and the end of the column for determining in y-direction is reached, the histograms 85 to 88 are evaluated.

There are several possibilities for finding the valid start values and end values from the four histograms 85 to 88:

1. The mean value of all values occurring in the respective histogram;
2. the median values (all values in order of their locations and then the center value) of all values occurring in the respective histogram;
3. centroid, e.g., centroid of area (quotient of the sum of all products of frequencies $H_i$ and their positions i and the sum of all frequencies);

$$W = \frac{\sum_i H_i \cdot i}{\sum_i H_i};$$

4. minimum (with start values) or maximum (with end values) position at which a valid value is found in the row or column of the histogram;
5. minimum (with start values) or maximum (with end values) position in the histogram at which a valid value exceeds a threshold;

6. position of the value occurring most frequently in the histogram;
7. position after which a minimum quantity of valid values has been reached in the histogram;
8. position in the histogram after which a minimum quantity of valid values exceeds a threshold;
9. position after which, starting from the first occurrence of a valid value, the integral of the frequency distribution curve has exceeded a determined threshold by percentage.

(In methods 4 to 9, in which the positions of the valid start values or end values are counted, counting proceeds upwards from the zero position with start values and downwards from the maximum position with end values).

In order to reduce computing, the method selected from the methods listed above is advisably applied only to a portion of the columns and rows of every image 31 to keep computing time short.

The start values and end values determined therefrom form the boundaries of a preferably rectangular surrounding shape 32 which completely contains the fingerprint 11. However, ellipses or similar plane shapes can also be used as surrounding shapes 32.

The surrounding shape 32, shown as a rectangular shape in FIGS. 10a and 10b, can also be limited to determination of a left start boundary 35 (StartX) and a right end boundary 36 (EndX) as is indicated in FIGS. 11a to 11c in case the calculation of the surrounding shape 32 is not worthwhile because the recording surface 21 is used virtually in its entirety lateral to the rolling direction of the finger 1.

In order to ensure that the fingerprint 11 will not be cropped under any circumstances, the fourth method of the methods mentioned above should be used. However, this would have the disadvantage that slight interference on the recording surface 21 results in a rectangle 33 that is too large and the readout speed is therefore limited.

In connection with an optoelectronic image recording unit 2 according to FIG. 5, the ninth method of the methods mentioned above has proven particularly advantageous. In order to rule out cropping of the fingerprint 11 to a great extent, a tolerance is introduced which is subtracted from the found start values and added to the end values. The same tolerance can later form a boundary area (subtracted from image edges) when putting the images 31 together in that no calculations are carried out to prevent edge problems in cutting out.

The tolerance should be selected in such a way that, while retaining the rectangle 33, the rolling finger 1 is still located in the rectangle 33 three images 31 later without being cropped.

When the sensor 22 of a camera 26, for example, is read out at 20 I/s and a normal roll process lasts 2 seconds, 40 images are recorded in this time. Assuming that the StartX line, which shows the (left) start boundary 35 of the rectangle 33 in FIGS. 8a and 8b, moves by 400 pixels within this time, it moves by 10 pixels between two successive images 31 provided it is a uniform movement (no acceleration). If it is desirable that the finger 1 is located in this rectangle 33 three images 31 farther, the tolerance area must have a size of at least 30 pixels. This tolerance guarantees that the finger 1—regardless of the direction in which it is rolled—is located in this rectangle 33 in every case.

A second issue in the calculation of the tolerance is the change in the readout speed at different sizes of the rectangle 33. In the event that the readout speed can be increased in the sensor 22 that is used (e.g., LM9638 with "windowing", National Semiconductors, Inc., USA) by determining an active pixel area 23, it is useful to change the tolerance as well.

As was mentioned in the example above, a sensor 22 of this type which can read out approximately 20 images per second when its active surface is completely read out and in which the start boundary 35 (left boundary=StartX line of the active pixel area 23) moves by 10 pixels from image to image, 40 images per second can be read out when the size of the active pixel area 23 is limited, e.g., to half of the active sensor surface and an image rate of 66 I/s can be realized when limiting to a third of the active sensor surface. Therefore, the line wanders by 5 or 3.33 pixels per image instead of by 10 pixels per image and the tolerance area can be limited to 15 or 10 pixels.

For movement tracking in the MT routine 62, a fixed rectangle size can also be used when the rectangle 33 is large enough that a fingerprint 11 always fits into it and it is ensured that this is the case also at least in the next image 31 given by the active pixel area 23. The rectangle 33 can be positioned in two ways:

around the centroid (preferably the centroid of area) of the fingerprint 11 in which the center of the rectangle 33 with a fixed size is situated;

by calculating the start and end values of the surrounding shape 32 according to one of the nine methods described above and positioning the fixed rectangle 33 around these limits in that the center of the fixed rectangle 33 is set to the calculated mean value from the start and end values.

When the boundaries of the rectangle 33 are determined with the tolerance, the found values are entered into the register of the sensor 22 of the image recording unit 2 which then records and reproduces only this area when the next image 31 is read out.

Roll Start Recognition 63 (RSR Routine 63):

After the MT routine 62 has evaluated the current image 31 and determined the new size of the shape 32, the positions of the shape 32 are compared with those of shapes 32 of preceding images 31 by running the RSR routine 63.

A roll process toward the right and toward the left, respectively, is shown schematically in FIG. 8a and FIG. 8b. In the sectional view at the top, it can be seen that the recording surface 21 is usefully divided into three thirds in order to correctly position the finger 1 so that the fingerprint 11 is rolled in its entirety on the recording surface 21. For this purpose, the finger 1 will preferably be placed in the second third and rolled in the first or third third. In so doing, a roll movement is already carried out, so that the centroid 34 and the boundaries 35 and 36 (StartX and EndX) of the rectangle 33 change.

When the aim is to carry out a roll process, e.g., from left to right, the finger 1 is placed in the center of the support surface 21 on the second third and rolled to the left to a start point for the complete roll process. The centroid, the start boundary 35 (on the left) and the end boundary 36 (on the right) of the rectangle 33 are likewise moved to the left. When the start point in the first third of the support surface 21 is reached, the roll process can be started by rolling the finger 1 toward the right. The changed movement direction of the end boundary 36 (on the right) is preferably detected as the start point of a roll process and the initiation of this event is conveyed to all system components that require this information.

The detection of the start point can also be determined by centroid displacement or as a combination of the movement reversal of the end boundary 36 and centroid 34. In the latter case, the change in the direction of the displacement of the centroid 34 and the change in the direction of the displacement of the end boundary 36 (EndX line) of the rectangle 33 serve as indicators. This variant is more robust than the first two.

Figure 9:
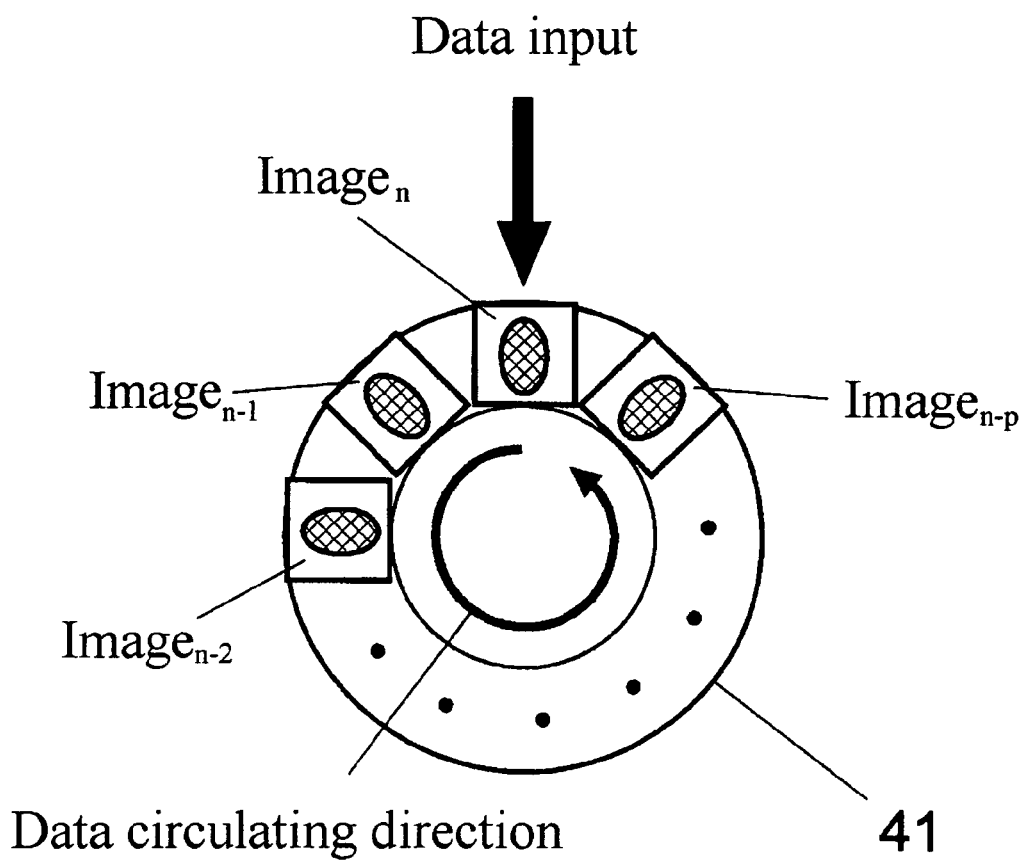
FIG. 9 is a schematic view of the data buffer storage for preserving read out images that were used for roll start recognition for subsequent combination to form the total image.

In order to make the method more robust, it is further possible to make the decision about whether or not a roll process is taking place only after a defined (larger) quantity of images 31 when their centroids 34 and/or end boundaries 36 (rectangle boundaries on right) have moved beyond this image quantity consistently in the same direction opposite to the initial direction. But this means that in order to process the read out images 31 a kind of ring buffer storage 41 is required (see FIG. 9) in which all images 31 from the actual start point of the roll process to the image 31 after which the start point is established are stored temporarily. Accordingly, at least a quantity p of images 31 required for determining the start of the roll process must fit into the ring buffer storage 41.

When the start point is determined, all images 31 are first read out of the ring buffer storage 41 and forwarded for processing.

All of the above considerations apply in exactly the same way when rolling is to proceed toward the left, except that the start boundary 35 (left boundary of the rectangle 33) is considered instead of the right boundary.

When the roll process has begun according to one of the criteria mentioned above, this is signaled to the external computing unit 4 (e.g., a PC) that is connected to the image recording unit 2 by the processing unit 5. Further, the computing unit 4 is informed about how many images 31 were used for determining the roll process so that it includes them from a buffer storage, in which the images 31 already used for preparing the active pixel area 23 of the image recording unit 2 are stored temporarily, to put together the total image 3. For this purpose, a ring buffer storage 41 is provided, according to FIG. 9, either in the processing unit 5, which is constructed as control hardware, or in the external computing unit 4. The images 31 needed for the RSR routine 4 are temporarily stored in this ring buffer storage 41. This means that the quantity of storage locations in the buffer memory 41 must be greater by one than the quantity of images 31 used for determining the roll start.

When a start point of a roll process has been detected, the loop 2 in FIG. 1 is terminated and loop 3 is initiated. This begins again with a put-on test (see PR routine 61) in order to terminate the recording of the roll process if the finger 1 is unexpectedly lifted off. When a valid fingerprint 11 is provided, the roll tracking is initiated.

Roll Tracking 64 (RT Routine 64):

The RT routine 64 is used for tracking the finger 1 during the defined rolling. It not only determines the centroid 34 and the boundaries 35 and 36 of the fingerprint 11 as in the movement tracking 42, but also determines the speed of the roll process by separately calculating the speed of the centroid 34 and/or the speed of the respective boundaries 35 and 36 of the rectangle 33. Further, the acceleration of the finger centroid 34 and/or the respective rectangle boundaries 35 and 36 is determined in order to detect temporary changes in the rolling speed.

Since the speeds and accelerations of the roll process are known and the rolling direction remains unchanged during the roll process, the selected tolerance between the surrounding shape 23 of the fingerprint 11 and the boundaries 35 and 36 of the enlarged rectangle 33 can be smaller compared to the MT algorithm 62.

If the rolling direction changes in the course of a plurality of images 31 or the finger 1 is lifted off in an image 31, this is detected by the RER algorithm 65 or the PR algorithm 61 and interpreted as a roll end.

During a roll process, the finger 1 is moved in a rolling manner over a support surface 21 on which the fingerprint 11 is recorded at different points in time regardless of the physical principle used for this. Due to the shape and elasticity of the finger 1, the width and height of the fingerprint 11 varies.

In this connection, FIG. 10a and FIG. 10b show two fingerprints 11 which are recorded at different, inconsecutive points in time. It can be seen that the width of the fingerprints 11 is different and the surrounding shape 32 accordingly also changes from width $\Delta S(n)=E(n)-A(n)$ to $\Delta S(m)=E(m)-A(m)$. When the width of the shape 32 around the fingerprint 11 is reduced, the image rate of the image recording unit 2 can be increased as a result of its more narrowly adjusted active pixel area 23.

In connection with the MT routine 62, it has already been explained how valid start values and end values are found by subtracting a fixed tolerance allowance from the start value and adding it to the end value. The size of the tolerance in the MT routine 62 is oriented to the maximum occurring speed of the roll process and is accordingly rigidly defined. As a result, the selected tolerance must be relatively large and image readout time is accordingly wasted. This is not a problem in the MT routine 62 because the recorded fingerprint 11 is used only for visualization. However, in a roll process it is necessary to read out as many images 31 per second as possible because every increase in readout speed brings about an improvement in correctly putting together the total image 3. Therefore, the readout time can be appreciably reduced by a priori knowledge concerning the roll process that has begun.

First, the rolling direction is known through the roll start recognition 63, i.e., the tolerance needs to have only a maximum value in one direction. Second, the speed and possible accelerations can be calculated due to the constant direction of rolling and a more exact prediction of the boundaries of the shape 32 surrounding the fingerprint 11 and therefore of the required rectangle 33 can be made. The process for determining the speed is shown in FIGS. 11a to 11c. During a roll in x-direction, principally three speeds are relevant: the speed of the centroid in x-direction (e.g., centroid of area of the print, centroid calculated as difference of the boundaries 35 and 36 of the surrounding shape 32 in x-direction) and the speeds of the two boundaries in x-direction. The same holds true in an analogous manner for the speeds in y-directions when rolling is carried out in y-direction. The speeds are calculated from the distances covered and the cycle time (maximum possible integration time). The speed is defined physically by:

$$v = \frac{ds}{dt} \approx \frac{\Delta s}{\Delta t}. \quad (1)$$

$\Delta s$ is the distance covered, e.g., the start boundary of the surrounding shape 32 calculated by:

$$\Delta s(n)=A(n)-A(n-1). \quad (2)$$

The index n describes a chosen point in time of the recording of an image 31 in the value range of $0 \leq n \leq N-1$ where N is the total quantity of all recorded images 31. Therefore, n−1 is the time of the precursor and n+1 is the time of the successor. $\Delta t$ represents the cycle time when using CCD and CMOS sensors, that is, the time required to read out the active pixel area 23 and, therefore, a limited image 31.

Sensors which do not afford the possibility of controlling the readout speed as a function of image size have a constant cycle time that relates to the readout of complete images and division by $\Delta t$ can be dispensed with in order to simplify the calculation. In sensors such as the LM9638 by National Semiconductors, Inc. (USA), in which the cycle time can be changed depending on the size of the active pixel area 23 that is used, the cycle time is calculated as follows:

$$\Delta t = T(n) = T_{Integration} = \frac{N_{Rows} \cdot (N_{Column} + R_{opcycle} + R_{1time})}{f_{PixelClock}}. \quad (3)$$

The pixel clock between 12 and 27 MHz of the sensor 22 is designated by $f_{PixelClock}$. The individual pixels are read out with this pixel clock. $N_{Rows}$ and $N_{Column}$ are the quantity of required rows and columns in the active pixel area 23 of the sensor 22. $R_{opcycle}$ is a fixed integral value of 140. This is the time required for carrying out all of the intermediate steps before and after reading out a row of the sensor 22.

When adapted rectangles 33 are read out as active pixel area 23 (Windows of Interest), $R_{ltime}$ is a fixed integer 34; otherwise, $R_{ltime}$ is zero. At a pixel frequency of 25 MHz and a complete readout of the sensor 22 with 1280×1024 pixels, for example, this gives an image rate of 16.8 images per second. If the RT routine 64 has just terminated, the width of the image 31 is accordingly reduced to one half (640×1024 pixels) and an image rate of 30 I/s (images per second) is achieved.

Another physical quantity for calculating the prediction of the next boundary 35 or 36 of the rectangle 33 is acceleration. It takes any change in speed into account in the calculation. The acceleration is calculated as follows:

$$a = \frac{dv}{dt} \approx \frac{\Delta v}{\Delta t} = \frac{v_A(n+1) - v_A(n)}{T(n+1)}. \quad (4)$$

The acceleration is determined from the two preceding speeds so that the first prediction is to be carried out without an acceleration calculation.

Experiments with rolling sequences have shown that the movement of the boundaries 35 and 36 of the surrounding shape 32 (i.e., in the rolling direction, the beginning and end of the fingerprint 11 in x-direction) at a constant cycle time resembles a tanh function and can be approximated by the following equation:

$$s_n = F\left[1 + \tanh\left(\pi \cdot \frac{n - \frac{N}{2}}{N}\right)\right] + Z \text{ [pixels]}. \quad (5)$$

The parameters F and Z serve to adapt the function to a real roll process and, by considering, e.g., for the start value at time t=0 and for the start value at the end of the roll process t=∞, can be calculated as follows:

$$F = \frac{Start_\infty - Start_0}{2 \cdot \tanh\left(\frac{\pi}{2}\right)}; Z = Start_0 - F \cdot \left[1 + \tanh\left(-\frac{\pi}{2}\right)\right]. \quad (6)$$

Figure 12A:
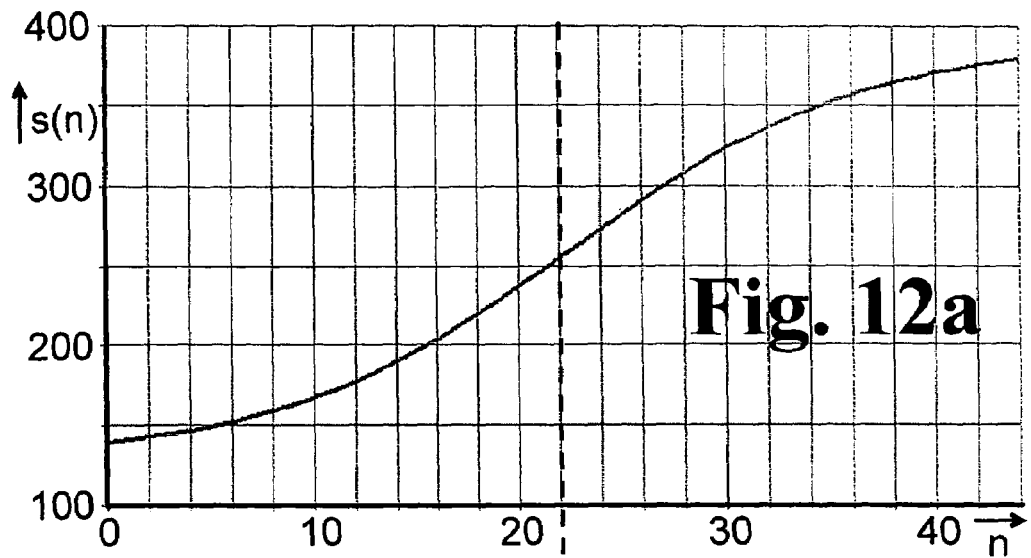
FIG. 12 shows the function curves of path, speed and acceleration of the boundaries of the surrounding shape over the number of scanned sensor pixels.

The values F=132 and Z=128, for example, resulted for a determined roll process. In this way, a curve can be obtained as shown in FIG. 12a. In FIG. 12a, s(n) represents the pixels rolled over by the finger 1 rolling on the support surface 21 of the image recording unit 2. It can be seen that the greatest change takes place between n=18 and n=24.

Figure 12B:
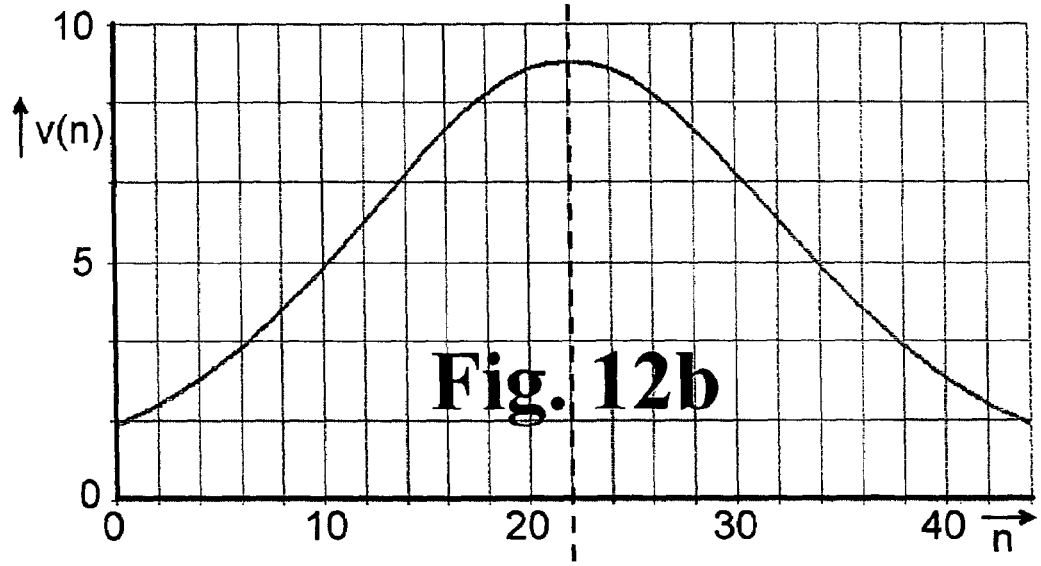

This change is also reflected in FIG. 12b which shows the speeds of the roll process. Division by time was omitted because of the constant time cycle. Accordingly, v(n) represents the pixel change at the respective time (how many pixels are rolled over before the next image 31). At n=22, the maximum speed is reached (9.2 pixels/image), i.e., the speed is greatest in the middle of the roll. Therefore, it is particularly important in this area that the image recording unit 2 is read out as quickly as possible.

Figure 12C:
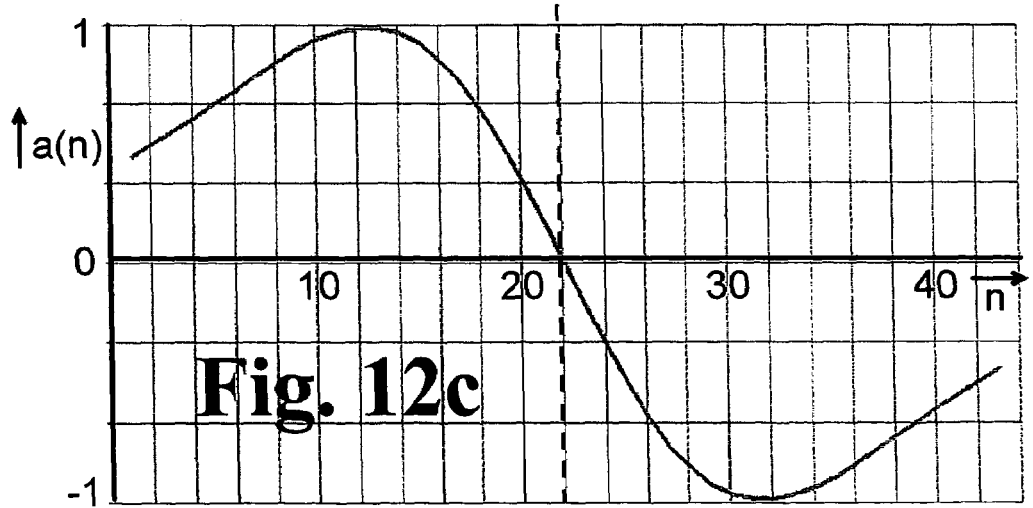

The acceleration of the roll process is plotted in FIG. 12c. In this case also, dividing by the cycle time is omitted since a constant cycle time was selected. Accordingly, a(n) represents the deviation of the pixel change between two successive images 31. Since the acceleration a(n) is the derivation of v(n), the value of a(n) is equal to zero at the maximum of v(n=22). The function a(n) also has two extreme values (0.5 and –0.5 pixels/image) when n=13 and when n=31. At both of these points, the change in speed between two read out images 31 is largest, i.e., the possibility of an incorrect calculation is greatest at these points, so that additional tolerance allowances Δ for expanding the rectangle 33 for purposes of adjusting a larger active pixel area 23 cannot be dispensed with.

A routine by which a more accurate prediction of the boundaries 35 and 36 of the rectangle 33 is realized is presented in the following. The fundamental condition is that after the RT routine 64 presented above, the exact boundaries 35 and 36 of the fingerprint 11 or of the shape 32 surrounding it have been determined and that two assumptions have been made as initial conditions.

Since at least two images 31 are needed for determining speed, an assumption must be made because otherwise no prediction can be made for determining the position of the boundaries of the second image 31.

Therefore, when a roll process has been recognized as started by the RSR routine 63, it is assumed that the position of the start boundary 35 for the first image 31 is identical to the position of the start boundary 35 for the second image 31. This assumption can be made because the finger 1 moves away from the starting position when rolling and it is accordingly certain that the fingerprint 11 cannot be cut off.

For the position of the end boundary 36 in the second image 31, a fixed value is added to the position of the end boundary 36 from the first image 31, which ensures that the fingerprint 11 in the second image 31 is still located before the end boundary 36.

A second assumption is necessary for predicting acceleration. For this purpose, at least three image 31 are required in order to make a prediction. Therefore, it is preferably assumed for the third image 31 to be recorded that the speed increases by a factor of 2.

Figure 13A:
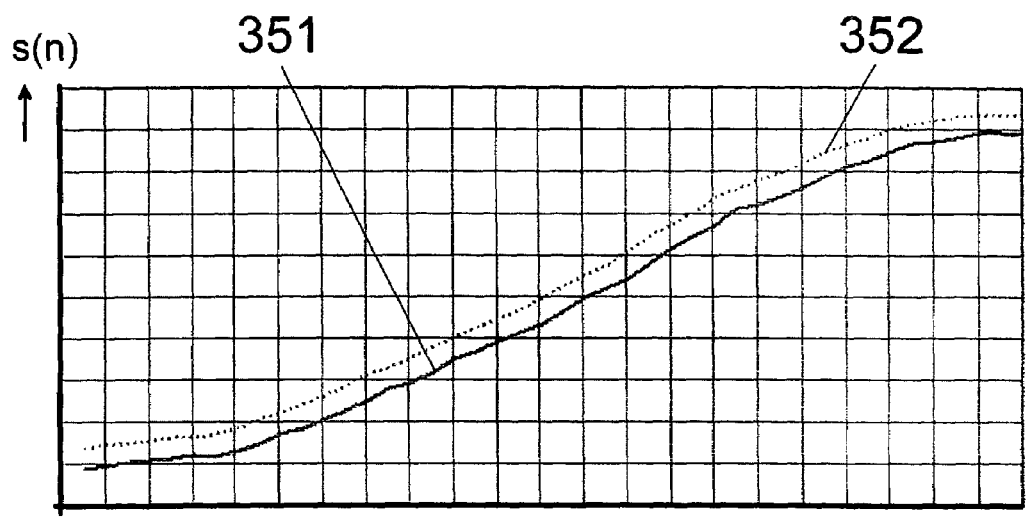
FIG. 13 is a schematic view showing the monitoring of the tolerance allowance for the position of the boundary of the rectangle as active pixel area for the next image readout for preventing cropping of the fingerprint in the subsequent image.
Figure 13B:
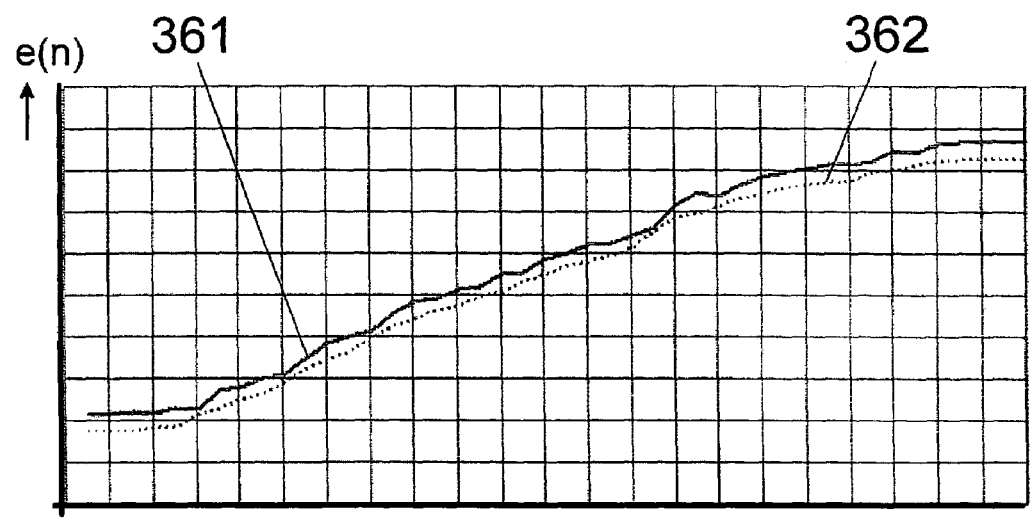

A procedure by which an accurate prediction of the next boundaries 35 and 36 of the rectangle 33 is realized will be described in the following. FIG. 13 shows the results of the method, where s(n) is the movement of the position of the start boundary 35 and e(n) is the movement of the position of the end boundary 36. The views in FIG. 13a and FIG. 13b represent a rolling movement from an origin at pixel 0 to the maximum value of the respective image recording unit 2.

FIG. 13a shows the movement of the position of the start boundary 35, wherein the solid line represents the predicted position 351 of the start boundary 35 of the rectangle 33 and the dashed line represents the position 352 of the imaged fingerprint 11 that is actually reached. During the movement of the start boundary 35, the position 352 that is actually reached does not lie below the solid line of the calculated position 351, since a cropping of the fingerprint 11 would occur otherwise.

This is reversed in the movement of the position of the end boundary 36 according to FIG. 13b. In this case, the calculated position 361 lies above the position 362 that is actually reached.

During a rolling movement in the opposite direction, that is, from the maximum possible position toward pixel 0 of the active pixel area 23 of the image recording unit 2, the propositions about the movement of the position of the start boundary 35 and end boundary 36 are correspondingly identical. In principle, the position 351, 361 of the start boundary 35 and end boundary 36, respectively, can be calculated beforehand by the following equation:

$$x'(n+1) = \frac{a_x(n)}{2} \cdot \Delta t^2 + v_x(n) \cdot \Delta t + x(n). \quad (7)$$

In this case, x'(n+1) is either the position of the start boundary s'(n+1) to be calculated or that of the end boundary e'(n+1). The apostrophe means that it is a quantity to be predicted which cannot be used to calculate the value after the next value. The quantity $a_x(n)$ represents the acceleration and $v_x(n)$ represents the speed of the start value ($a_s$, $v_s$) or end value $a_E$, $v_E$) at the current time. The current position is represented by x(n).

A position of the next value of the boundaries of the surrounding shape 32 is calculated by equation (7) under the assumption that the speed and acceleration do not change. However, this assumption does not correspond to reality; rather, the change in the pixel position during a roll process approximately describes a tanh function as was already described above with reference to FIGS. 12a-c. Therefore, some safety precautions must be taken for predicting the exact position of the boundaries 35 and 36 of the rectangle 33 surrounding the fingerprint 11. These safety precautions consist again in defining a tolerance which includes the boundaries of the fingerprint 11 and ensures that the fingerprint 11 is always located within an enlarged rectangle framing the shape 32.

The tolerance to be selected in this case is smaller than in the MT routine 62, since the rolling direction is known. It has proven useful to carry out a risk estimation, i.e., a minimum value estimation at the position of the start value (boundary 35) and a maximum value estimation at the position of the end value (boundary 36) are carried out between the calculated position 351 or 361 and the position 352 or 362 actually reached. Accordingly, an additional certainty is incorporated.

A possible formula for the start value and the end value (boundaries 35 and 36) for a roll from the smaller pixel position to the larger pixel position is:

$$\text{Start value: } s'(n+1) = \frac{a(n)}{2} \cdot \Delta t^2 + v(n) \cdot \Delta t + \text{MIN}[s(n), s'(n)] - \text{Tol1} \quad (8)$$

$$\text{End value: } e'(n+1) = \frac{a(n)}{2} \cdot \Delta t^2 + v(n) \cdot \Delta t + \text{MAX}[e(n), e'(n)] + \text{Tol2}$$

Tol1 is the tolerance of the start value when rolling from left to right. It can be smaller than the tolerance Tol2 of the end value because the position 352 of the start boundary 35 at time n is definitely smaller than the position 352 of the start boundary 35 at time n+1. Therefore, the actual position 352 of the start boundary 35 at time n can theoretically be taken as the predicted position 351 of the start boundary 35 at time n+1 and the value of Tol1 can be assumed to be zero. However, since the detection of the roll end occurs within the roll sequence and the change of direction is a feature for the roll end, a determined quantity must be used for tolerance Tol1.

In the opposite rolling direction, formula (8) changes to:

$$\text{Start value: } s'(n+1) = \frac{-a(n)}{2} \cdot \Delta t^2 - v(n) \cdot \Delta t + \text{MIN}[s(n), s'(n)] - \text{Tol2} \quad (9)$$

End value: $e'(n+1) =$ $$\frac{-a(n)}{2} \cdot \Delta t^2 - v(n) \cdot \Delta t + \text{MAX}[e(n), e'(n)] + \text{Tol1}$$

In this case, Tol1 can be smaller than Tol2, since the roll process is carried out from right to left and the end boundary 36 at time n is definitely greater than the position 362 of the end boundary 36 at time n+1.

There are many other possibilities for calculating, including the use of a tanh function, to predict the boundaries 35 and 36 of the rectangle 33.

It is also possible to work with a fixed size of the rectangle 33 and to use the algorithm presented herein to find the boundaries 35 and 36 of the shape 32 surrounding the fingerprint 11 and to adapt the position of the rectangle 33 with the fixed value to the changed position of the surrounding shape 32. That is, it is determined based on the fingerprint 11 imaged in the current image 31 which maximum rectangle width is necessary for ensuring that the fingerprint 11 is not cropped by the rectangle 33 during normal object movement. The location of the next positions of the boundaries 35 and 36 of the surrounding shape 32 is derived subsequently as was described above. These values give the position of the next rectangle 33 and the fixed rectangle size must be placed around the calculated surrounding shape 32 in such a way that the distance of the boundaries of the rectangle 33 from the boundaries from the minimum start value and maximum end value of the surrounding shape 32 is identical on all sides. The position of the fixed rectangle 33 following therefrom is programmed in the image recording unit 2 as active pixel area 23 for the next image 31. As was described above, the positioning of the rectangle 33 which is always of the same size can also be carried out by means of a centroid algorithm which, e.g., searches for the area centroid of the fingerprint 11 and places the fixed rectangle 33 around it. However, as a result of this, cropping of the fingerprint 11 cannot be ruled out.

The cutting out of an enlarged rectangle 33 containing the fingerprint 11 can also be carried out outside the image recording unit 2 when the data rate is sufficient in reading out the complete sensor 22 but the defining element for the required data rate is the transmission channel. In this case, the method according to the invention is applied in the same way, except that the computation is based upon the complete image as image 31 and not already upon a selected active pixel area 23. It is then no longer necessary to predict where the next start boundary 35 or end boundary 36 is located because the image 31 is available as a complete image of the image recording unit 2 so that calculation of speeds and accelerations can be dispensed with. This means that the complete image is read into the processing unit 5 (according to FIG. 5), by means of an image recording unit 2 with a higher image rate. The processing unit 5 determines the boundaries 35 and 36 of the fingerprint 11 (surrounding shape 32) and an enlarged rectangle and conveys only the portion of the complete image corresponding to the content of the currently determined enlarged rectangle 33 to the external computing unit 4 via the interface 55. If a cropping of the fingerprint 11 occurs during the roll process in spite of all safety precautions (tolerance allowances) during the prediction, it is necessary to proceed in the following manner, e.g., when rolling from left to right, in the two possible cases:

1. Cropping of the finger by the start boundary 35 of the rectangle 33

With this error, which is caused by the finger 1 having moved more slowly than was predicted, the start boundary 35 is retained as an input value without recalculating speed or acceleration, but the tolerance is increased.

2. Cropping of the finger by the end boundary 36 of the rectangle 33

Since the cause of the error is that the finger 1 moved faster than was predicted, twice the tolerance allowance is used when calculating the next position of the surrounding rectangle 33 assuming the same speed.

This ensures that the fingerprint 11 in the next image 31 is located within the start boundary 35 and end boundary 36 of the rectangle 33.

As can be seen from FIG. 1, the RT routine 64 is bookended by the put-on recognition 61 and a roll end recognition 65 (RER routine). The PR routine 61 and the RER routine 65 check whether the finger 1 was lifted off during the roll process or whether the finger 1 was moved over a sequence of images 31 in the opposite direction to the detected rolling direction. If the finger 1 was lifted off during the roll, this is detected by the PR routine 61 and interpreted as a roll end. The other possibility for conclusion of the RT routine 64 is caused by a roll end recognition 65 which will be explained in the following.

Roll End Recognition 65 (RER Routine 65)

The RER routine 65 determines whether or not a roll process has ended. The positions of the start boundary 35 and end boundary 36 of the rectangle 33 determined by the RT routine are used for this purpose. During a roll process, the user is requested to roll the finger 1 in the opposite direction to the original rolling direction when the user wants to end the roll process. Therefore, the boundaries 35 and 36 determined by the RT algorithm (e.g., over more than three images 31) change in the direction opposite to the original rolling direction. This can then be definitively determined as a roll end. In order to make the RER routine 65 robust, five images are advisably necessary in order to ensure that the roll process has ended.

The lifting of the finger 1, which is determined by the PR routine 61 described above, is likewise evaluated as a roll end. When the roll end has been detected, the register in which the adapted rectangle 33 was stored as active pixel area 23 of the sensor 22 is erased so that the entire sensor surface is active again.

The processes described above can also be applied when a large active surface of the image recording unit 2 must be used for recording a complete footprint or handprint and only a small part of the area of the same sensor surface is required for recording a rolling finger 1. With a sensor 22 having the special possibility of "windowing", the large-area recording with the necessary resolution, as well as the considerably higher image rate for recording a fast series of images of the rolling finger 1, can be realized by means of the control, according to the invention, of the active pixel area 23 of the sensor 22.

In order to realize the processes illustrated in FIG. 1, it is necessary to have fast control hardware as processing unit 5 in order that the computing unit 4, which is provided for image processing for the purpose of assembling the successively read out images 31, is not loaded by all of the calculation routines for controlling the active pixel area 23. FIG. 5 shows an arrangement which has, following the image recording unit 2, a logic unit 51, a processor 54, a program storage 52, a data storage 53 and an interface 55, wherein the logic unit 51 and the processor 54 can be combined as a data processing unit or computing unit. The program storage 67 and data storage 68 can also be combined in one storage. The CPU of the external computing unit 4 can also be used as a processor 54. The logic unit 51, the processor 54 and the interface 55 exchange information relevant for the roll via the control bus 56. Further, the logic unit 51 and interface 55 are connected to one another by the image data bus 57 for transmitting the image data.

The image recording unit 2, whose sensor is based on CMOS or CCD technology, preferably contains a control circuit and an analog-to-digital converter. Accordingly, a fingerprint 11 is present at the output of the image recording unit 2 as a two-dimensional digital image 31. This is written into the data storage 53 by the logic unit 51. The algorithms and processing routines described above are executed in the processing unit 5. The logic unit 51 can also be realized by means of a FPGA (Field Programmable Gate Array), PLD (Programmable Logic Device), or ASIC (Application Specific Integrated Circuit). A microcontroller (MCU), a microprocessor (MPU) or a digital signal processor (DSP) can be used as a processor 54.

While the foregoing description and drawings represent the present invention, it will be obvious to those skilled in the art that various changes may be made therein without departing from the true spirit and scope of the present invention.

| Reference Numbers: | |
|---|---|
| 1 | finger |
| 11 | fingerprint |
| 12, 12a-e | image strips |
| 13, 14, 16 | papillary ridge |
| 131-133 | (imaged) segments |
| 141-143 | segments |
| 15a-c | solid ellipse |
| 15d, 15e | dashed ellipse |
| 16a-e | ridge cutoffs |
| 161 | ridge branching |
| 162-164 | papillary ridge termination |
| 17 | intersection area |
| 2 | image recording unit |
| 21 | recording surface |
| 22 | sensor |
| 23 | active pixel area |
| 24 | illumination unit |
| 25 | prism |
| 26 | camera |
| 3 | total image |
| 31 | image |
| 32 | surrounding shape |
| 33 | enlarged rectangle |
| 34 | centroid |
| 35 | start boundary |
| 36 | end boundary |
| 4 | (external) computing unit |
| 41 | ring buffer storage |
| 5 | processing unit |
| 51 | logic unit |
| 52 | program storage |
| 53 | data storage |
| 54 | processor |

-continued

| Reference Numbers: | |
|---|---|
| 55 | interface |
| 56 | control bus |
| 57 | image data bus |
| 61 | put-on recognition (PR routine) |
| 62 | movement tracking (MT routine) |
| 63 | roll start recognition (RSR routine) |
| 64 | roll tracking (RT routine) |
| 65 | roll end recognition (RER routine) |
| 71, 72 | gradient image |
| 73, 74 | difference value |
| 75, 76 | difference counter |
| 77 | row counter |
| 78 | column counter |
| 81, 82 | gradient image |
| 83, 84 | difference value |
| 85, 86, 87, 88 | spatial histogram |

What is claimed is:

1. A method for the electronic recording of a moving object which is rolled on a recording surface and has a surface structure that causes a print on the recording surface, wherein the object is detected in a series of high-resolution individual image frames during the object movement by means of a spatially resolving image recording unit and processed as a two-dimensional electronic image, comprising the steps of:
determining a shape surrounding the object image from the position and size of the object image in the individual image frames read out from the image recording unit;
determining an enlarged rectangle being oriented parallel to the row direction and column direction of a sensor contained in the image recording unit and being enlarged by tolerance allowances ($\Delta$) calculated from the surrounding shape of the object image and an estimate of the object movement; and
using said enlarged rectangle to adjust an active pixel area being restricted in size and position within the entire sensor area for at least one succeeding image frame being read out subsequently from said active pixel area of the image recording unit, so that the read out active pixel area is always kept small due to its adaptation to the detected shape and movement of the object image and thus a higher image rate is realized in the sensor readout or data transfer.

2. The method according to claim 1, wherein the surrounding shape of the object image is determined by converting a current image frame having columns and rows of pixels with individual intensity gray values into two gradient images formed in the column direction and in the row direction, wherein one gradient image is derived from the current image frame by taking differences between gray values of adjacent pixels for each pixel in the row direction and one gradient image by taking differences between gray values of adjacent pixels for each pixel in the column direction.

3. The method according to claim 2, wherein said differences of gray values are taken from the gray values of a predecessor pixel and a successor pixel of every pixel in the rows or the columns of the current image frame.

4. The method according to claim 2, wherein said differences of gray values are taken from the gray values of a predecessor pixel and a post-successor pixel of every pixel in the rows or the columns of the current image frame.

5. The method according to claim 2, wherein start values and end values of the surrounding shape of the object image are determined from the two gradient images for the rows and the columns of the current image frame, wherein a first significant difference and a final significant difference between adjacent gray values is determined in every gradient image for calculating the start value and end value of the shape surrounding the object image.

6. The method according to claim 5, wherein the significant differences are determined by exceeded threshold values.

7. The method according to claim 5, wherein a mean value is calculated from the start values as well as from the end values determined from the gradient image in at least one dimension corresponding to a principal movement direction of the object, wherein the mean values form the boundaries of a rectangular shape surrounding the object image.

8. The method according to claim 5, wherein a median value is formed from the start values as well as from the end values determined from the gradient image in at least one dimension corresponding to a principal movement direction of the object, wherein the median values form the boundaries of a rectangular shape surrounding the object image.

9. The method according to claim 5, wherein the start values and end values of the rows or columns in at least one dimension corresponding to a principal movement direction of the object are plotted in each instance into a spatial histogram, wherein the spatial histogram shows locations at which a certain frequency distribution of the start values and end values adopts a defined value and which form the boundaries of a rectangular shape surrounding the object image.

10. The method according to claim 9, wherein a first or a last valid value of the frequency distribution is used in the spatial histogram as the location of the boundary of the surrounding shape.

11. The method according to claim 9, wherein a value of the frequency distribution that exceeds a predetermined threshold value the first time or the last time is used in the spatial histogram as the location of the boundary of the surrounding shape.

12. The method according to claim 9, wherein a value of the frequency distribution after which or before which all other values of summed frequencies exceed a threshold is used in the spatial histogram as the location of the boundary of the surrounding shape.

13. The method according to claim 9, wherein the value of the greatest frequency is used in the spatial histogram as the location of the boundary of the surrounding shape.

14. The method according to claim 9, wherein only the start values and end values of selected rows or columns of the gradient image are used for determining the boundaries the surrounding shape.

15. The method according to claim 1, wherein the tolerance allowance (A) for generating the enlarged rectangle is determined differently depending on a detected movement course of the object image, wherein different evaluation algorithms based on the time change of the boundaries of the surrounding shape in at least two previously read out successive image frames, are applied after determining the boundaries of respective surrounding shapes from the at least two previously read out image frames.

16. The method according to claim 1, wherein the moving object is a finger, and wherein an actual fingerprint is recorded as object image in every individual image frame being read out successively in a series during a movement of the rolled finger.

17. The method according to claim 16, wherein a put-on recognition routine which stops the calculation of the tolerance allowance ($\Delta$) and subsequent predictions and adjustments of the active pixel area of the sensor is applied to the successively read out image frames when a current image frame having columns and rows of pixels with individual intensity gray values is converted into two gradient images, wherein one gradient image is generated in the row direction by taking differences between the gray values of adjacent pixels for each pixel in the rows and another gradient image is generated in the column direction by taking differences of gray values of adjacent pixels in the columns, and an insufficient quantity of said differences of adjacent gray values resulting from a fingerprint is determined.

18. The method according to claim 16, wherein a movement tracking routine which determines the tolerance allowances ($\Delta$) around the boundaries of the surrounding shape of the object based on a time change of the boundaries in at least two previously read out successive image frames, is applied to successively read out image frames—in which a movement of the surrounding shape is not clearly directed in such a way that the size of the tolerance allowance ($\Delta$) being selected as a uniform tolerance allowance ($\Delta$) on all sides around the boundaries of the surrounding shape so that the enlarged rectangle does not cut off the fingerprint within the time period of the readout of at least a next image frame during any movement of the fingerprint to an extent typical for a rolled finger.

19. The method according to claim 18, wherein the movement tracking routine is switched to a roll tracking routine being initiated when the boundaries of the surrounding shape have shifted in a direction in a defined quantity of successive images, wherein a tolerance allowance ($\Delta$) for the boundary of the surrounding shape shifted in the movement direction of the finger is determined from a calculated speed of the shifted boundary such that the enlarged rectangle does not cut off the fingerprint within the time period of at least one image that is read out subsequently.

20. The method according to claim 19, wherein the roll tracking routine is initiated by a roll start recognition routine and terminated by a roll end recognition routine, wherein the roll start recognition routine initiates the roll tracking routine when there is a determined fixed number of displacements of the boundaries of the surrounding shape proceeding in the same direction, and the roll end recognition routine terminates the roll tracking routine when the movement of the boundaries of the surrounding shape reverses direction.

21. The method according to claim 16, wherein a roll tracking routine is applied to the successively read out image frames when the boundaries of the surrounding shape have shifted in a direction in a defined quantity of successive images, wherein a tolerance allowance ($\Delta$) for the boundary of the surrounding shape shifted in the movement direction of the finger is determined from a calculated speed of the shifted boundary such that the enlarged rectangle does not cut off the fingerprint within the time period of at least one image frame that is read out subsequently.

22. The method according to claim 20, wherein all images already used for the roll start recognition routine are buffered by the roll start recognition routine in order that the images that were already read out for the roll start recognition routine are kept available for completing the total image of the rolled finger.

* * * * *